Dec. 1, 1959 E. V. CRANE ET AL 2,914,973

PILGER MILL

Filed Nov. 8, 1955 24 Sheets-Sheet 1

INVENTORS
EDWARD V. CRANE
RICHARD L. CURTNER
WILLIAM S. WAGNER

BY [signature]

INVENTORS
EDWARD V. CRANE
RICHARD L. CURTNER
WILLIAM S. WAGNER
BY

Dec. 1, 1959 E. V. CRANE ET AL 2,914,973

PILGER MILL

Filed Nov. 8, 1955 24 Sheets-Sheet 3

INVENTORS
EDWARD V. CRANE
RICHARD L. CURTNER
WILLIAM S. WAGNER
BY

[signature]

Dec. 1, 1959 E. V. CRANE ET AL 2,914,973

PILGER MILL

Filed Nov. 8, 1955 24 Sheets-Sheet 4

INVENTORS
EDWARD V. CRANE
RICHARD L. CURTNER
WILLIAM S. WAGNER
BY

INVENTORS
EDWARD V. CRANE
RICHARD L. CURTNER
WILLIAM S. WAGNER
BY

Dec. 1, 1959 E. V. CRANE ET AL 2,914,973

PILGER MILL

Filed Nov. 8, 1955 24 Sheets-Sheet 6

INVENTORS
EDWARD V. CRANE
RICHARD L. CURTNER
WILLIAM S. WAGNER
BY

PILGER MILL

INVENTORS
EDWARD V. CRANE
RICHARD L. CURTNER
WILLIAM S. WAGNER
BY

PILGER MILL

INVENTORS
EDWARD V. CRANE
RICHARD L. CURTNER
WILLIAM S. WAGNER
BY
[signature]

INVENTORS
EDWARD V. CRANE
RICHARD L. CURTNER
WILLIAM S. WAGNER
BY

INVENTORS
EDWARD V. CRANE
RICHARD L. CURTNER
WILLIAM S. WAGNER
BY

INVENTORS
EDWARD V. CRANE
RICHARD L. CURTNER
WILLIAM S. WAGNER
BY

INVENTORS
EDWARD V. CRANE
RICHARD L. CURTNER
WILLIAM S. WAGNER
BY
[signature]

Dec. 1, 1959 E. V. CRANE ET AL 2,914,973

PILGER MILL

Filed Nov. 8, 1955 24 Sheets-Sheet 13

INVENTORS
EDWARD V. CRANE
RICHARD L. CURTNER
WILLIAM S. WAGNER
BY [signature]

INVENTORS
EDWARD V. CRANE
RICHARD L. CURTNER
WILLIAM S. WAGNER
BY

[signature]

Dec. 1, 1959 E. V. CRANE ET AL 2,914,973

PILGER MILL

Filed Nov. 8, 1955 24 Sheets-Sheet 15

INVENTORS
EDWARD V. CRANE
RICHARD L. CURTNER
WILLIAM S. WAGNER
BY

INVENTORS
EDWARD V. CRANE
RICHARD L. CURTNER
WILLIAM S. WAGNER
BY

INVENTORS
EDWARD V. CRANE
RICHARD L. CURTNER
WILLIAM S. WAGNER
BY

INVENTORS
EDWARD V. CRANE
RICHARD L. CURTNER
WILLIAM S. WAGNER
BY

INVENTORS
EDWARD V. CRANE
RICHARD L. CURTNER
WILLIAM S. WAGNER
BY

INVENTORS
EDWARD V. CRANE
RICHARD L. CURTNER
WILLIAM S. WAGNER
BY

INVENTORS
EDWARD V. CRANE
RICHARD L. CURTNER
WILLIAM S. WAGNER
BY

INVENTORS
EDWARD V. CRANE
RICHARD L. CURTNER
WILLIAM S. WAGNER
BY

Dec. 1, 1959 E. V. CRANE ET AL 2,914,973

PILGER MILL

Filed Nov. 8, 1955 24 Sheets-Sheet 23

INVENTORS
EDWARD V. CRANE
RICHARD L. CURTNER
WILLIAM S. WAGNER
BY

INVENTORS
EDWARD V. CRANE
RICHARD L. CURTNER
WILLIAM S. WAGNER
BY

United States Patent Office 2,914,973

Patented Dec. 1, 1959

2,914,973

PILGER MILL

Edward V. Crane and Richard L. Curtner, Canton, and William S. Wagner, Navarre, Ohio, assignors, by mesne assignments, to the United States of America as represented by the Secretary of the Navy Application November 8, 1955, Serial No. 545,806

7 Claims. (Cl. 80—14)

This invention relates to improvements in mills for the cold pilgering of metal tubing, mills of the type wherein the roll carriage, commonly called the saddle, reciprocates, and the tubular stock or work-piece, which is held stationary on a mandrel during each working stroke of the saddle, is fed forward over the mandrel to the rolls in short increments between successive working strokes. One of its objects is to provide a mill of this type which is not only capable of use for producing tubing of uniform diameter in the manner described, for example, in U.S. Patent No. 2,594,126 but which can also be operated to produce tapered tubes in the manner set forth and claimed in U.S. Patent No. 2,349,-246. Another object is to provide hydraulic power-transmitting means for a mill of the reciprocating-saddle type, and in particular for driving the heavy saddle, having regard more particularly to the saving of power and the provision of automatic safety controls. A general object of the invention is to make it practicable to process tubular stock of a much larger size and heavier wall than heretofore owing to the lack of suitable reducing mills.

A mill embodying the invention is shown in the accompanying drawings, whereof:

Figs. 14A, 14B, 14C and 14D, taken together, illustrate diagrammatically the hydraulic system embodied in the mill.

Figure 15:
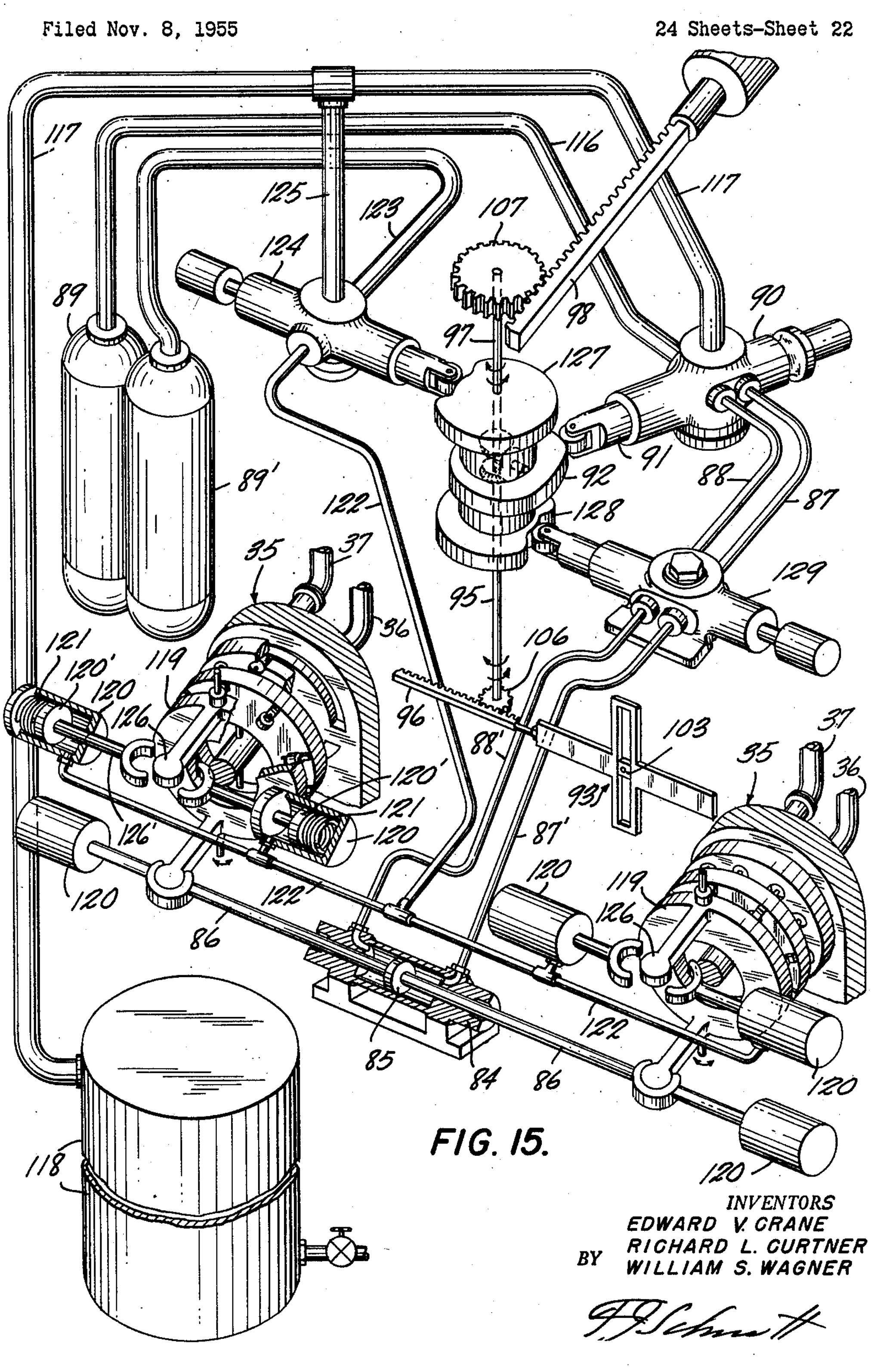

Fig. 15 is a diagram illustrating the operation of the saddle control.

Figure 16:
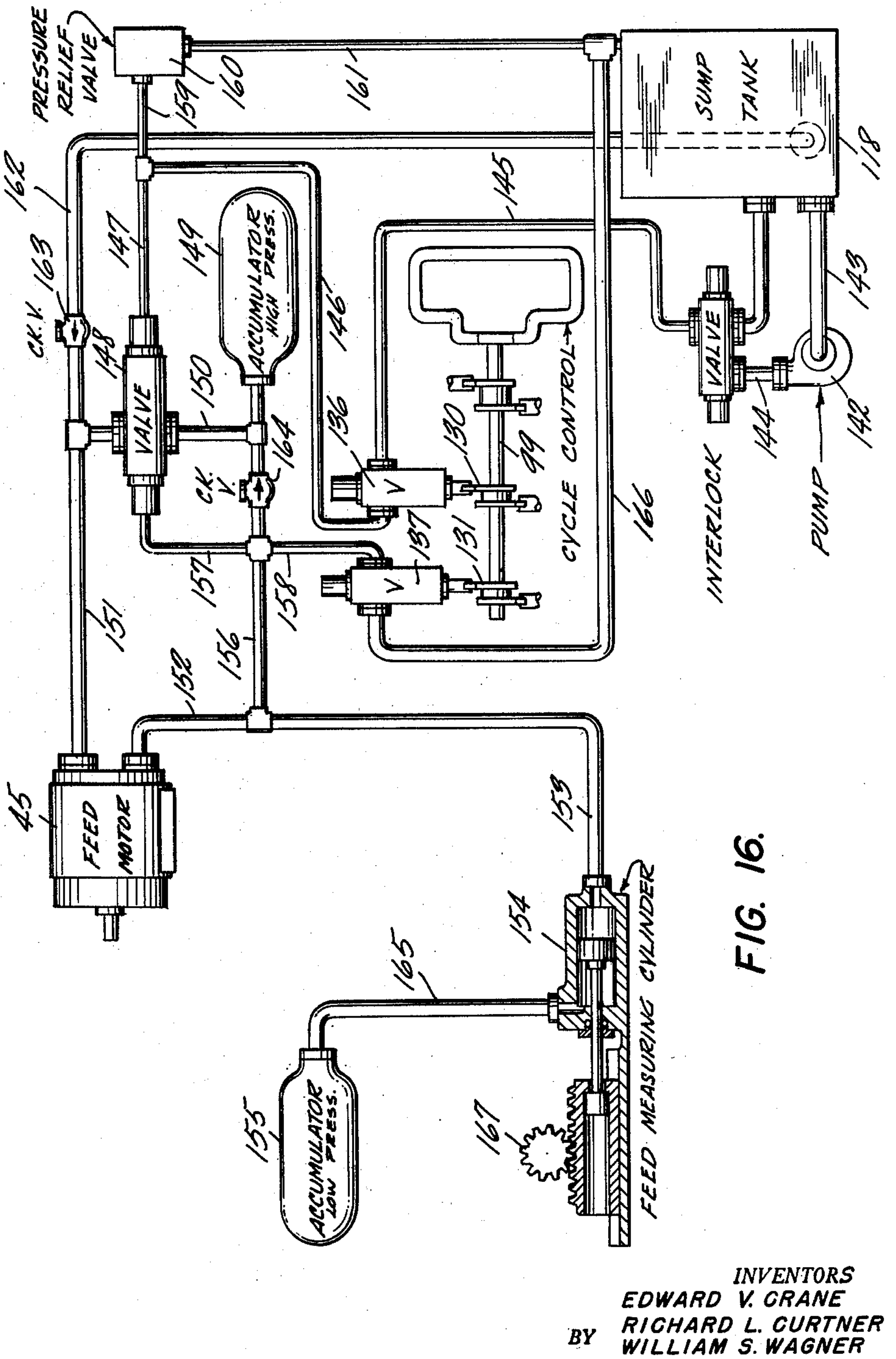

Fig. 16 is a diagram of the cycle control for the stock feeding mechanism.

Figure 17:
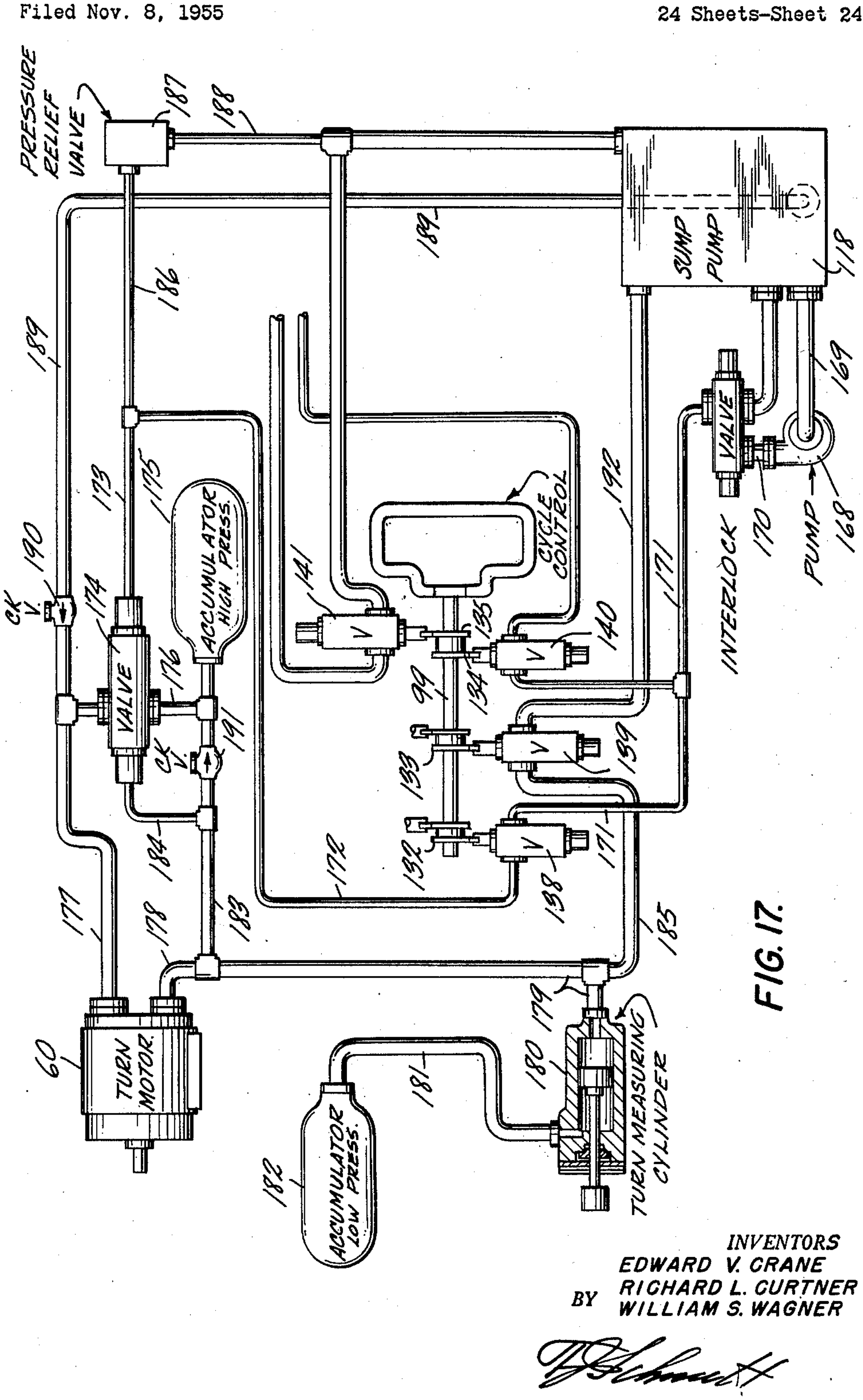

Fig. 17 is a diagram of the cycle control for the stock and mandrel turning mechanism.

*The operating cycle*

In the present pilger mill, as in the mill of the aforesaid Patent No. 2,594,126, the saddle 10, during each operating cycle, makes one complete reciprocation, that is to say, if the start of a cycle is taken as coincident with the beginning of any forward stroke of the saddle, the latter causes the pair of cooperating reducing rolls 11 to traverse the tubular stock or work-piece 12 in a forward direction, then reverses its direction and causes the pair to roll back over the same section of stock and return to their starting position. The roll-pair, as in the aforesaid patent, is provided with interchangeable die-sets of different sizes, each set being formed with a tapering groove; and the rolls are geared together and one of them is geared to fixed racks 13 whereby the rolls are oscillated as the saddle moves. Moreover the rolls are so disposed in the saddle that, on their forward stroke, the larger end of each groove of the dies first contacts the stock and rolls on the stock from that end toward the smaller end thus reducing or deforming the stock on the mandrel 14 while the latter is held stationary. Thus, as will be seen, the working stroke of the rolls is coincident with the forward stroke of the saddle. Upon the completion of the forward stroke of the saddle, the mandrel and stock are given a partial turn, say, 60 degrees, about their common axis when the mill is used to produce tubing of uniform diameter, so that upon each backward or return stroke of the saddle, the rolling of the dies on the same section of stock will smooth out any ridges or fins which may have been formed thereon at the meeting edges of the dies during the forward stroke. Upon completion of the backward stroke, the stock is given an increment of feed forward on the mandrel; and this completes the operating cycle. If, as generally will be the case, the operation of the mill is stopped when the saddle is at the end of its forward stroke and the operating cycle is assumed to begin with the saddle in that position, the order of steps in the cycle will be: (1) rearward stroke of the saddle, (2) feeding an increment of stock, (3) forward stroke of saddle, (4) turning the mandrel and stock. This operating cycle is the same as in the mill of the aforesaid Patent No. 2,594,126 and substantially the same in most pilger mills of the present type heretofore in use.

*The saddle*

Figures 1, 2:
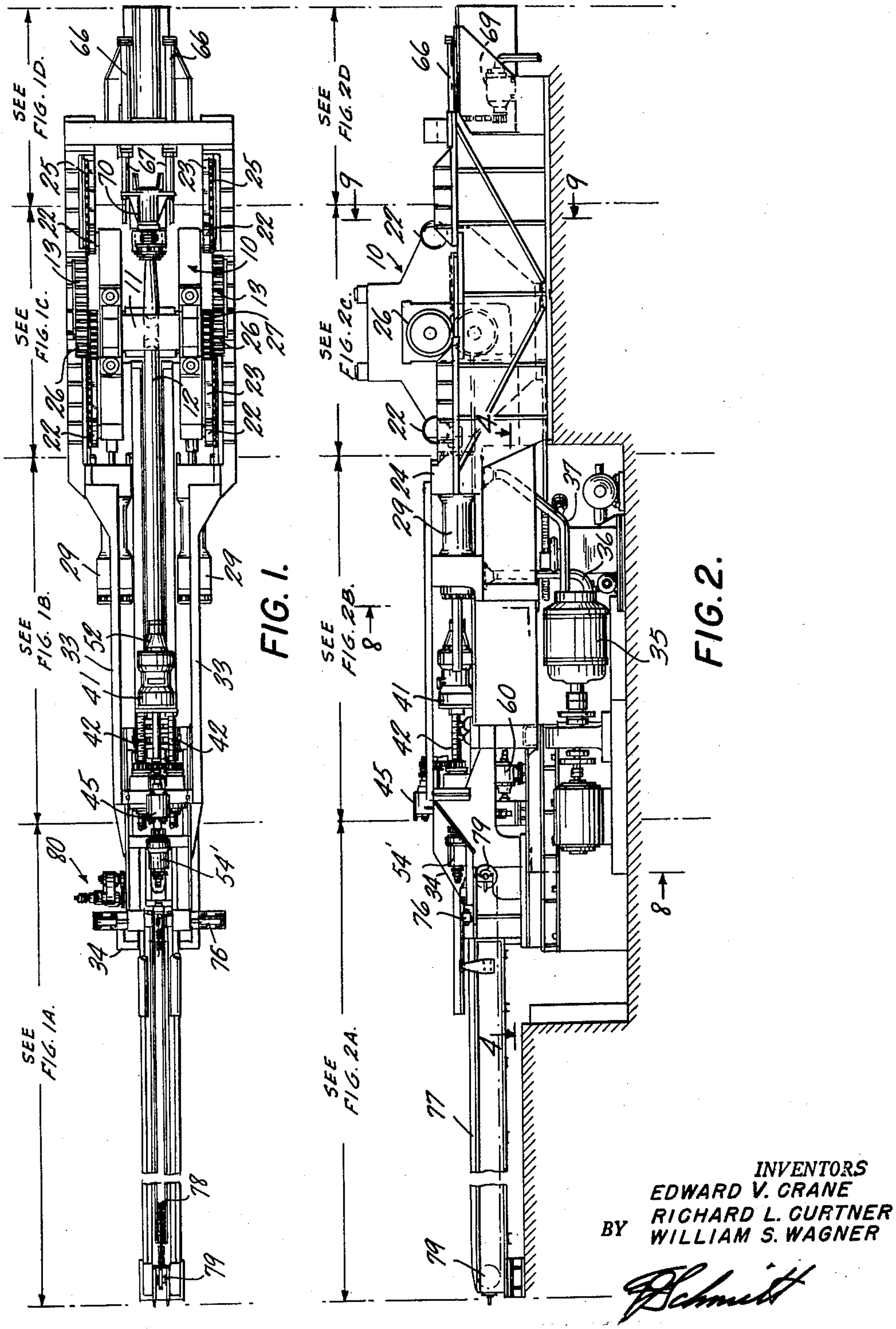
Figs. 1 and 2 are broken views, respectively in plan and side elevation, and on a relatively small scale, of the mill when assembled and set up for producing tapered tubes.
Figure 1A:
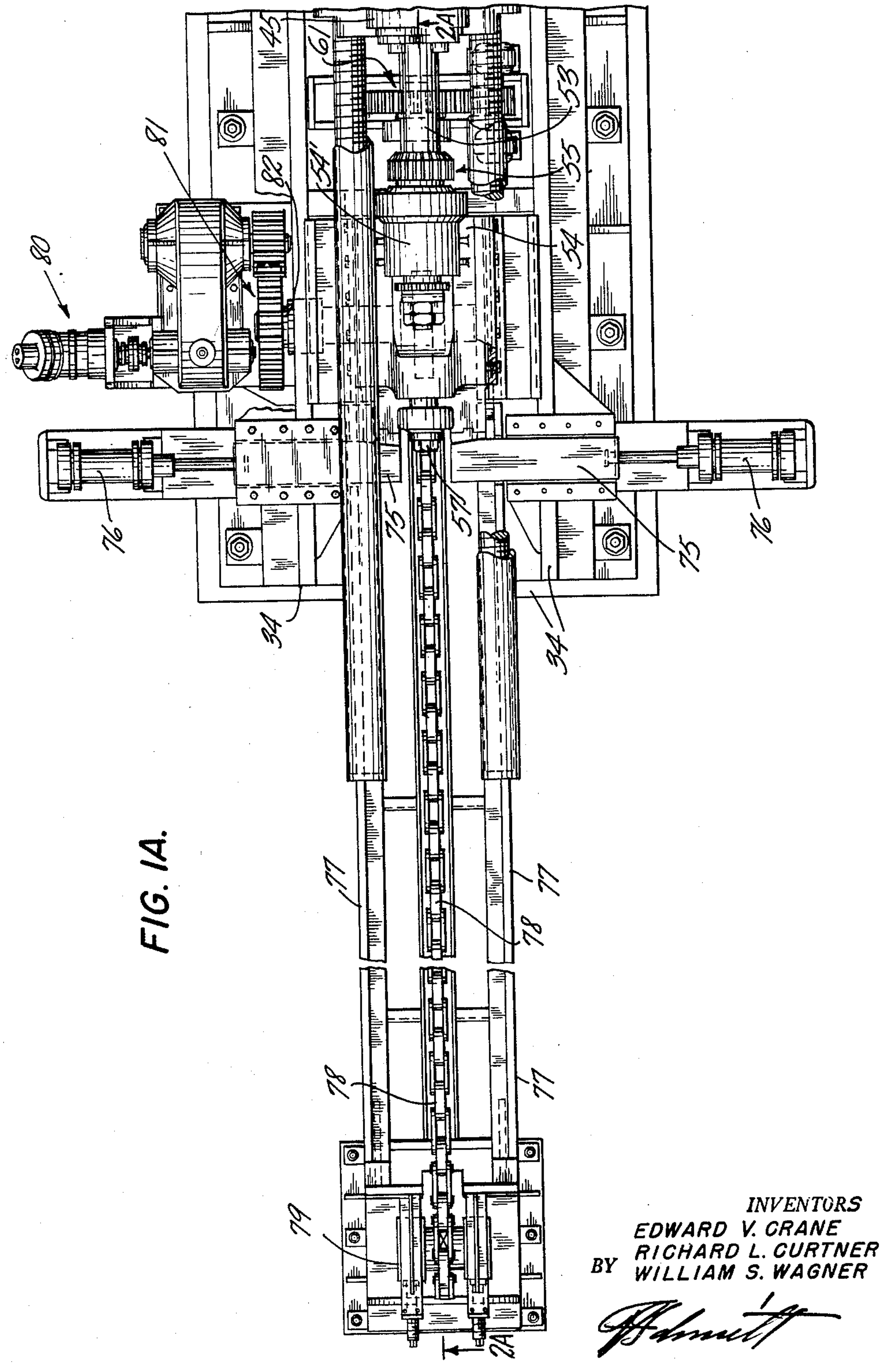
Figs. 1A, 1B, 1C and 1D are plan views respectively, on a larger scale, of successive sections (denoted as A, B, C and D) of the mill from its rear to its forward end, and as to which the location of each section is indicated in Figs. 1 and 2.
Figure 1B:
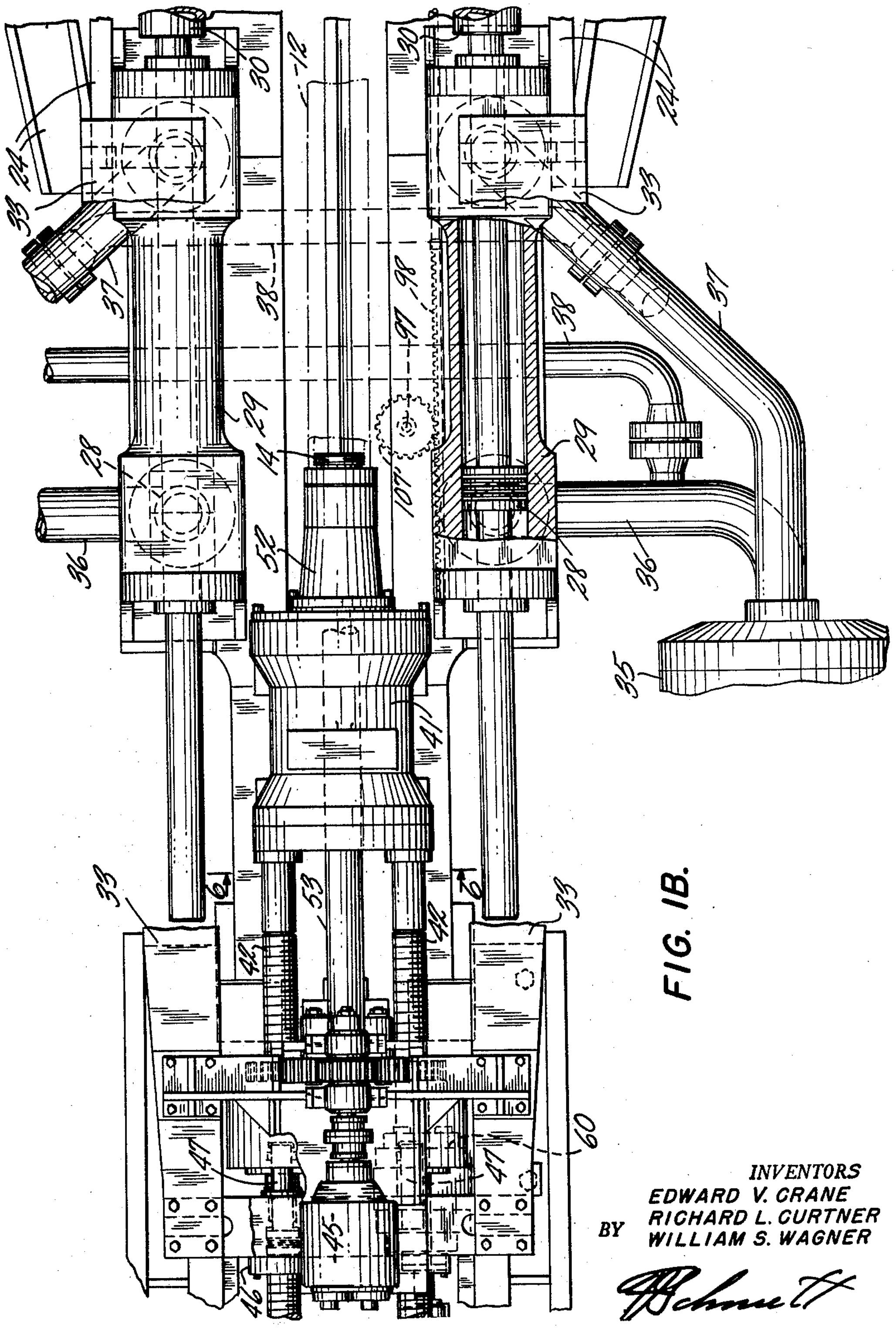
Figure 1C:
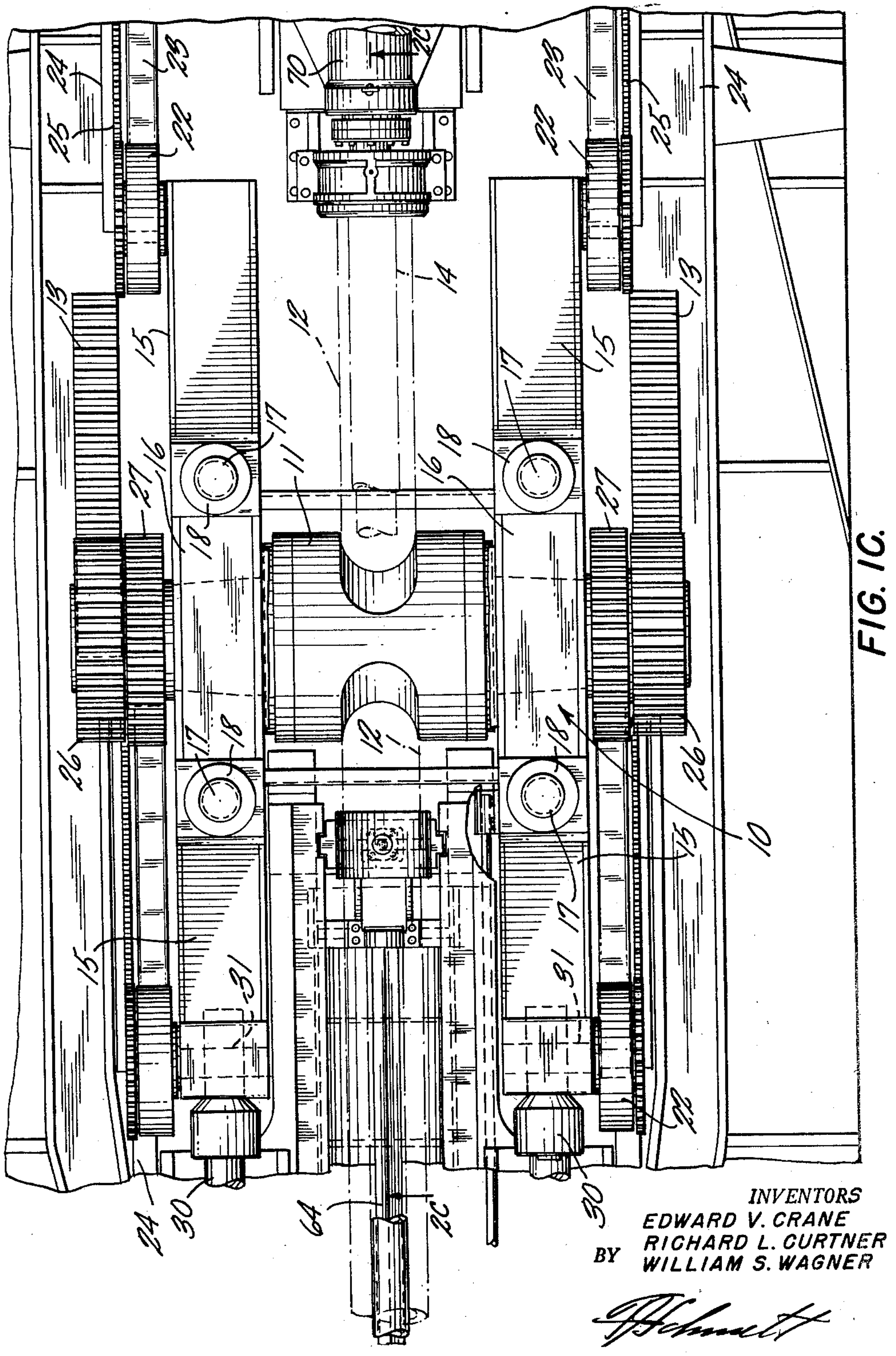
Figure 1D:
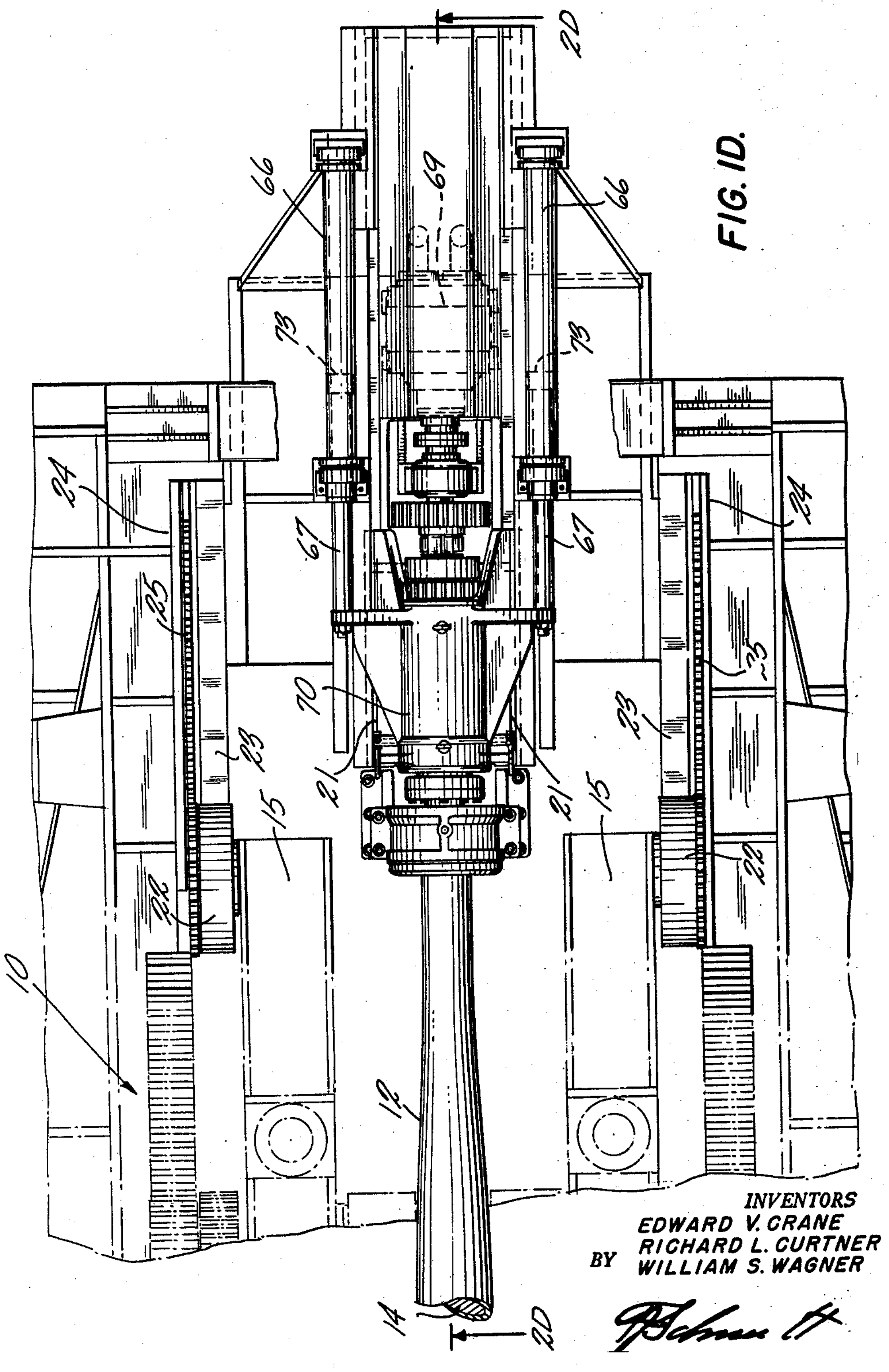
Figure 2A:
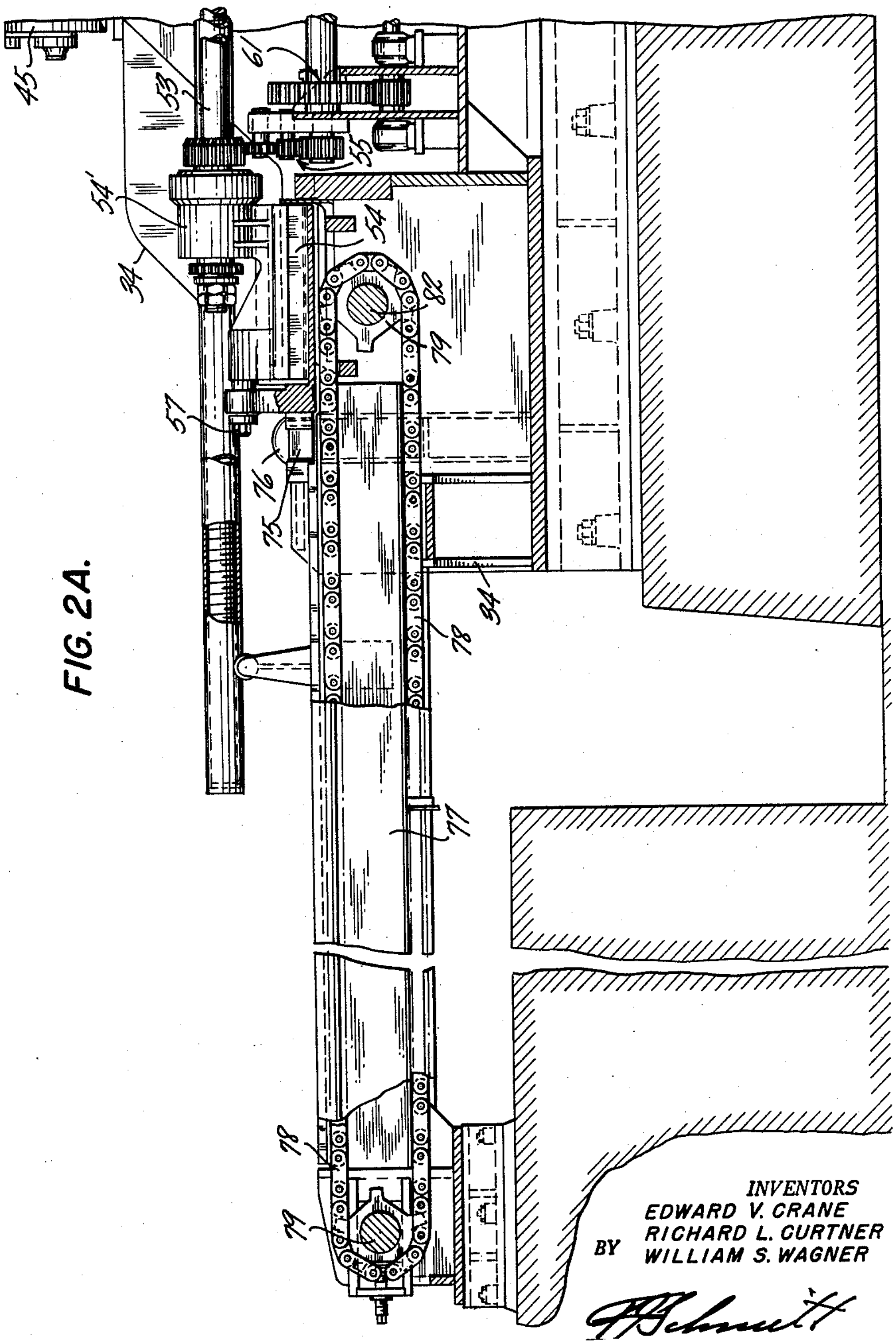
Figs. 2A, 2B, 2C and 2D are views in side elevation corresponding respectively to and on the same scale as the sections 1A, 1B, 1C and 1D.
Figure 2B:
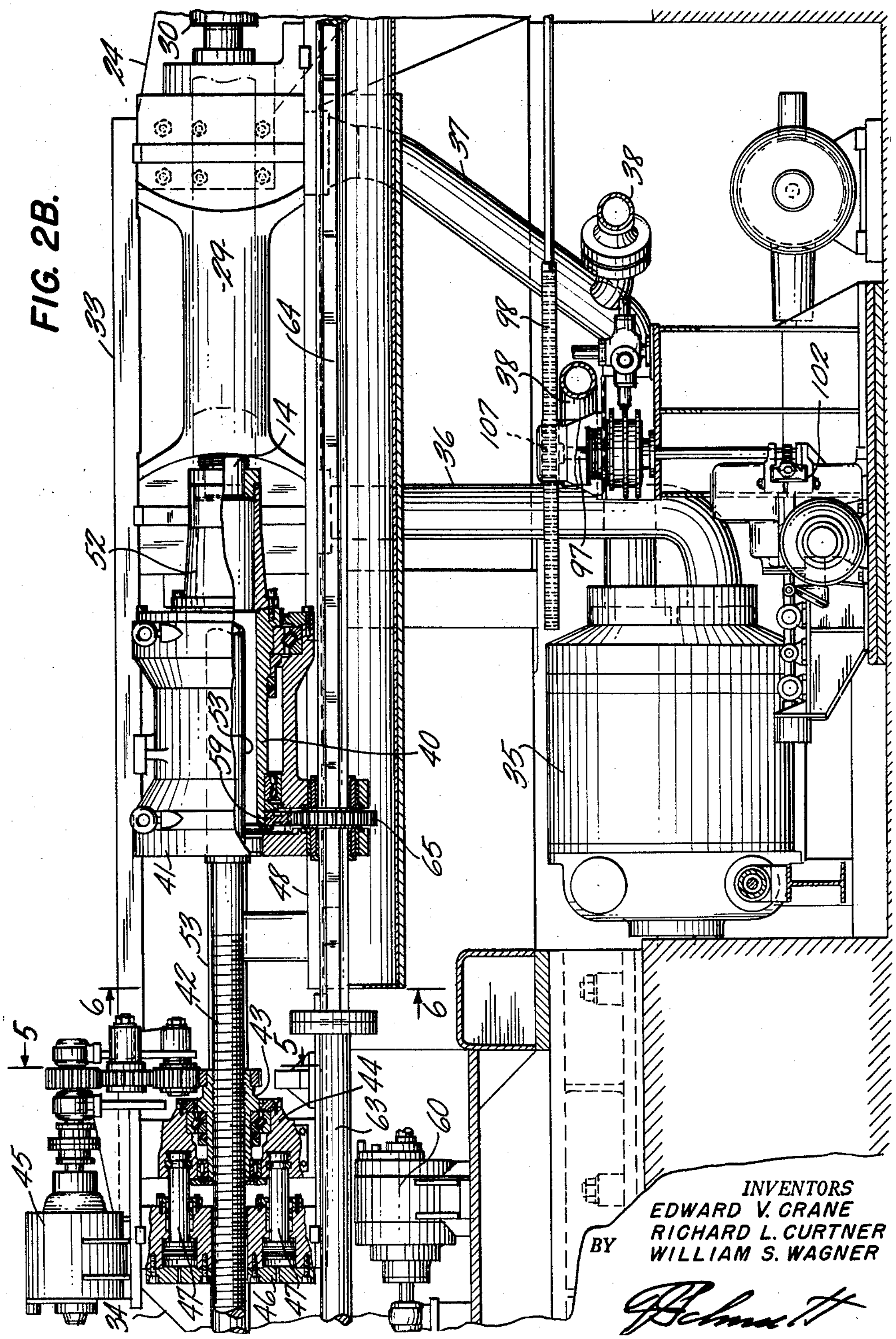
Figure 2C:
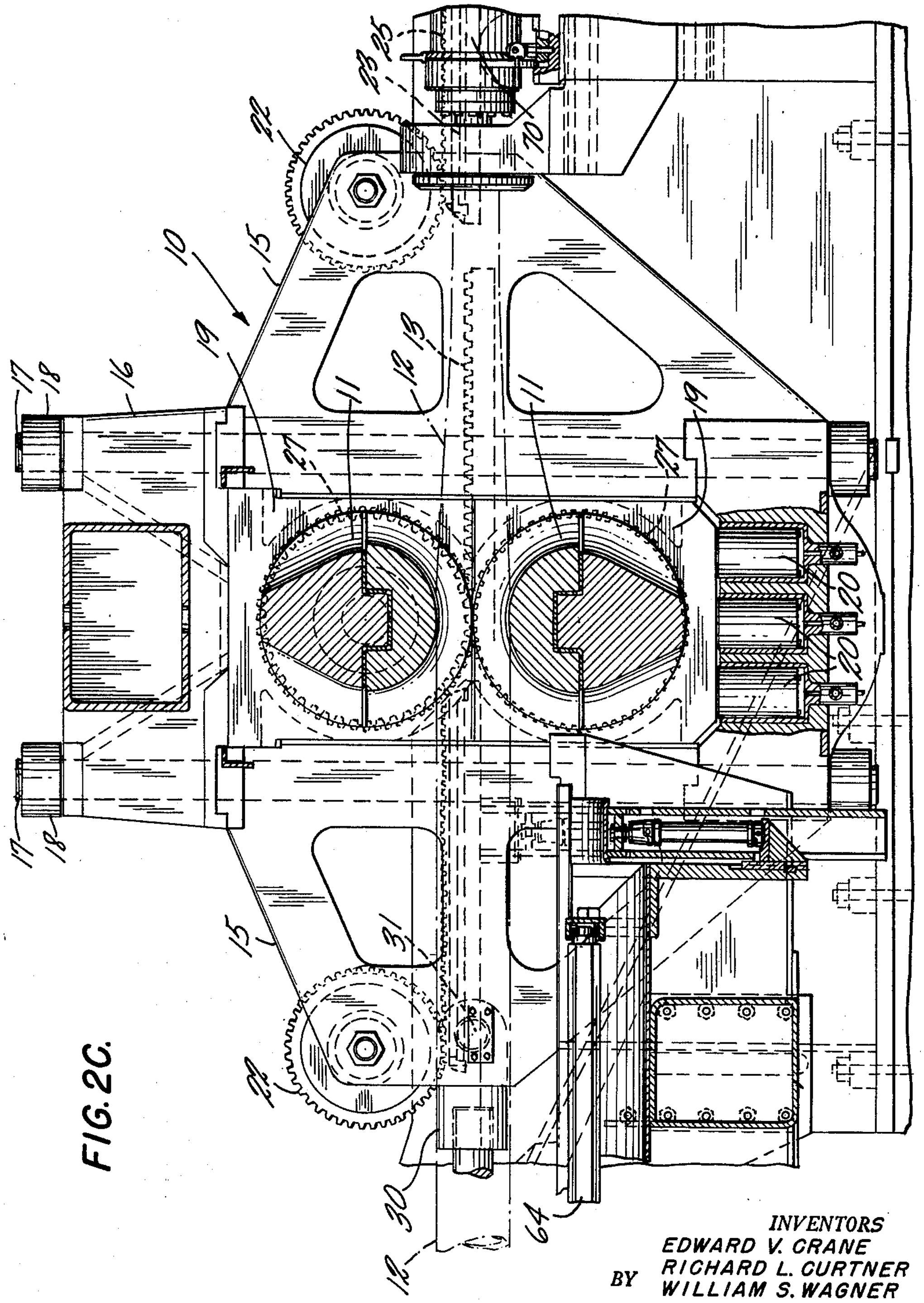
Figure 9:
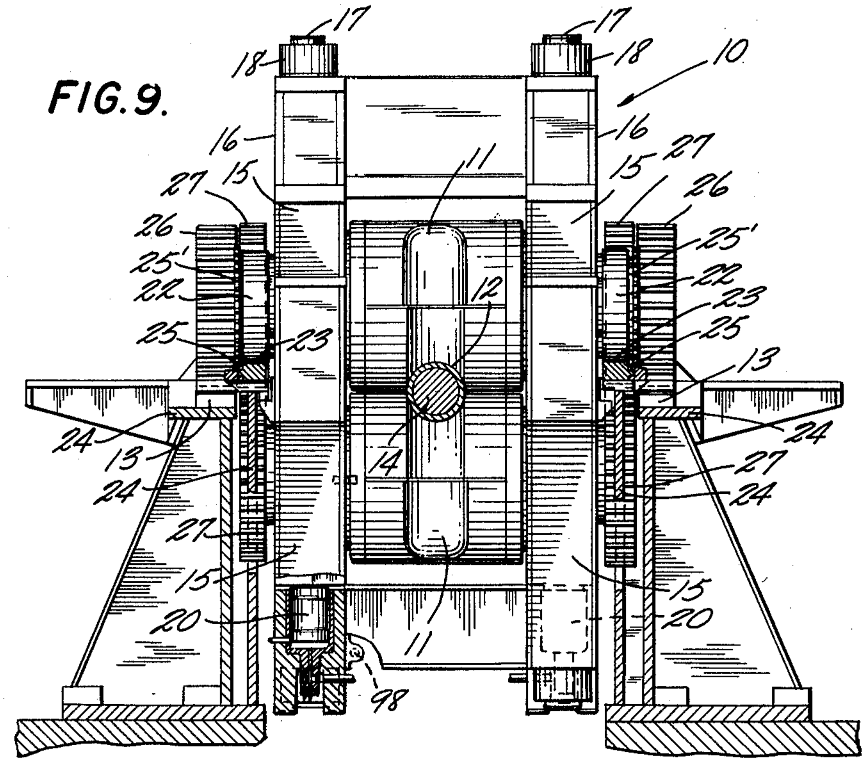
Fig. 9 is a sectional view taken on a plane indicated by the line 9—9 in Fig. 2.
Figure 10A:
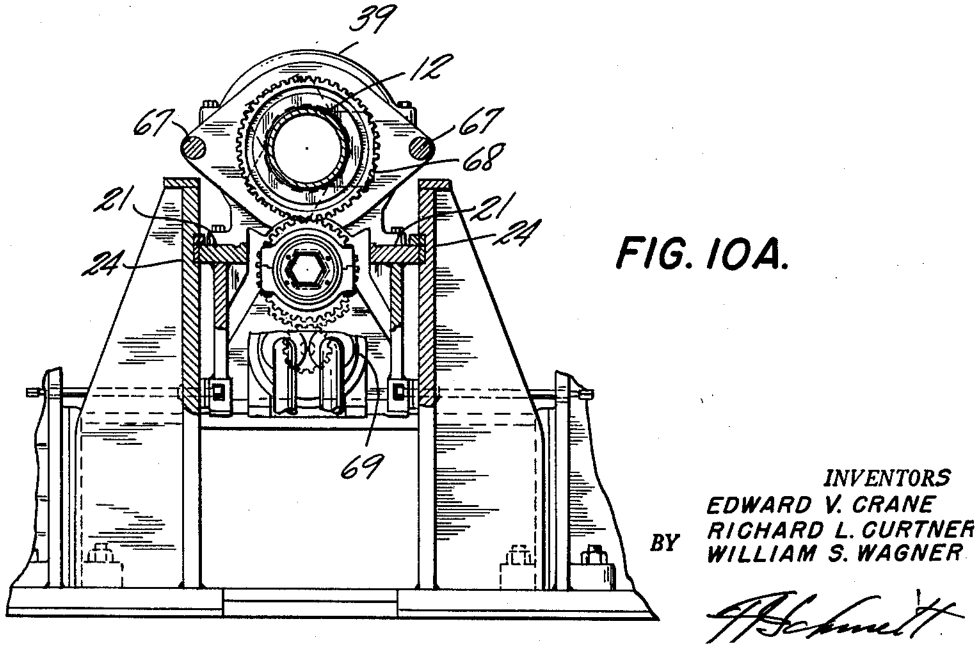
Fig. 10A is a broken view (similar to that of Fig. 10) when the mill is assembled and set up for rolling uniform diameter tubing.

The reciprocating roll-carriage, or saddle, is shown to best advantage in Figs. 1C, 2C and 9 and may comprise a weldment 15 with a crown-piece 16 held securely to its two side frames by four tie-rods 17 and four nuts 18, the latter being shrunk in place to pre-load the saddle for strength. The pair of reducing rolls 11 are preferably supported in chucks 19 fitted to the saddle, and the top roll chucks held rigidly in place by the pressure of said tie-rods, while the bottom roll chucks are preferably supported on hydraulically controlled plungers 20, six of which are present in the mill shown in the drawings, whereby the necessary pre-load pressure may be applied to the rolls for their proper operation on the stock to be rolled. The said plungers also act as a safety device by releasing all pressure between the two rolls and allowing the bottom roll to drop by gravity if and when the mill should at any moment become overloaded. The saddle is preferably supported at its front and rear ends by four wheels or rollers 22 which rest on and traverse tracks 23 secured along each side of the saddle to the side frame 24; and said wheels are geared to cooperating racks 25 to prevent skidding or slipping. On the ends of the top roll are gears 26 which mesh with the aforesaid fixed racks 13; and as the rolls have interlocking gears 27 mounted on their hubs, they are oscillated as the saddle reciprocates, as previously stated.

The saddle, according to the present invention, is driven hydraulically by the pistons 28 of two cylinders 29 which pistons are fastened to the rear of the saddle by clevises 30 and pins 31. These cylinders are secured to the side frame 24 and a main supporting beam 32 and also to bars 33 which in turn are securely fastened to the back frame 34. The motive power for driving the saddle, as well as for driving most of the other moving parts, is supplied by hydraulic pressure. For the saddle, this pressure is generated by electrically driven pumps 35, two of which are preferably provided, one for each cylinder 29, in any case where a large amount of fluid (oil) is required for driving a very heavy saddle. When the pumps 35 are started up, they are filled with oil which they drive through pipes 36 into the cylinders 29 behind the pistons 28; and this causes the pistons to push the saddle forward and at the same time drives such oil as is in front of the pistons out of the cylinders and back into the pumps through pipes 37, the fluid thus traversing a closed circuit. Equalizer ducts 38 are employed each communicating with both cylinders 29 in order to ensure that each cylinder takes an equal load. During the return stroke of the saddle fluid flows from said pumps to said cylinders through the pipes 37.

*The stock feeding mechanism*

Figure 3B:
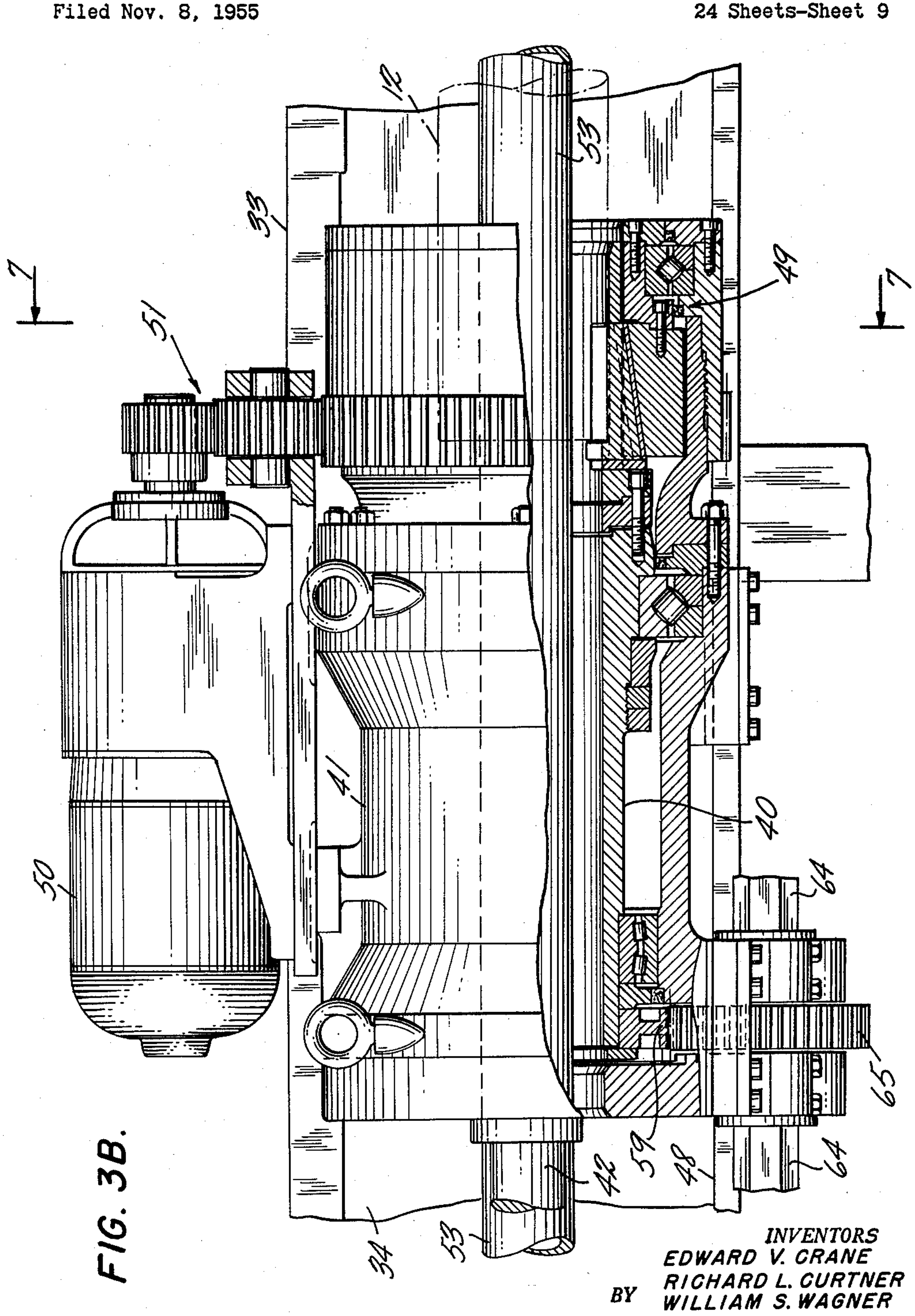
Fig. 3B is a view partly in elevation and partly in section, of the cross-head assembly and vise for holding the stock or work-piece when the mill is assembled and set up for rolling tubing of uniform diameter.
Figure 5:
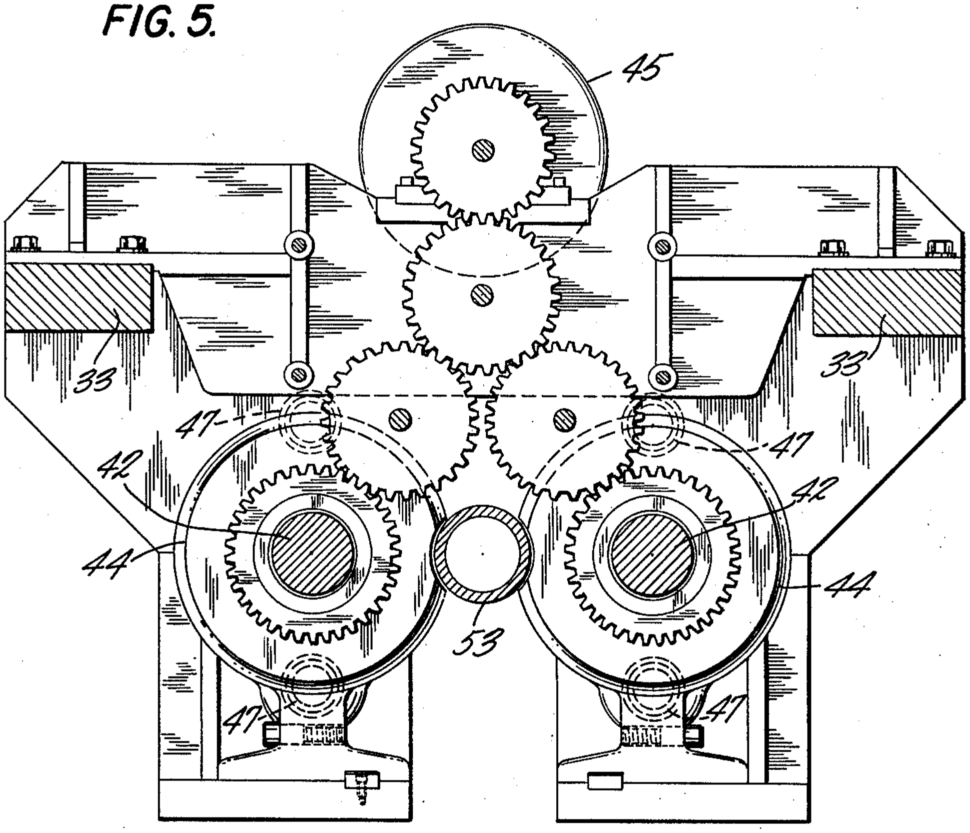
Fig. 5 is a sectional view taken on a plane indicated by the line 5—5 in Fig. 2B.

In producing tubing of uniform diameter (sometimes referred to as straight tubing to distinguish from tapered tubes) the rear end of the stock in the present mill, as in the mill of the aforesaid Patent No. 2,594,126, is rigidly held in a vise 49 secured to a spindle 40 mounted in a cross-head 41 which is fed forward in increments by axially immovable nuts turning on non-rotating threaded shafts. In the present case (see Figs. 2A, 2B and 5) there are two such threaded shafts marked 42 and two such nuts marked 43 which are turned intermittently in their housings 44 by the stock feeding motor 45. The thrust of the nuts is taken by a fixed member 46 between which and the said housings are equalizing pistons 47 so that equal loads will be taken by each said shaft. The cross-head 41 slides on ways 48. The vise 49 is tightened and/or loosened by a motor 50 through gears 51 to cause the gripping fingers of the vise to securely clamp the rear end of the stock to the spindle 40 in the forward end of the cross-head, whereby the intermittent rotation of the aforesaid nuts 43 will feed the stock forward to the rolls in increments. When the present mill is to be used for producing tapered tubes in accordance with the method of the aforesaid Patent No. 2,349,246, the vise 49 with its associated stock-gripping device are detached from the spindle 40 and removed from the mill; and, in their place, a spindle extension 52 is fastened to the front end of said spindle; and the rear end of the stock is screwed onto said extension (compare Figs. 2B and 3B).

*The mandrel and stock turning mechanism*

Also, as in said Patent No. 2,594,126, the mandrel rod 53 is held stationary at its rear end and provided with means for turning it on its axis at the end of each forward stroke of the saddle. In the present case, the main turning mechanism for the stock includes the spindle 40 enclosed within the cross-head 41 which is mounted on slides 48 to which it is held by gibs 56. The rear end of the mandrel rod 53 is held in a spindle housing 54' and turned by the main turn motor 60 through gears 55; and through a nut 57 the position of the mandrel in relation to the grooves in the rolls may be varied to adjust the size of the bore and wall thickness conformably to the finished tubing to be rolled. The turning of the spindle 40 within the cross-head 41 is effected by a pinion 59 operatively connected to said motor 60 through gears 61. Said motor 60 turns a shaft 63 connected to a long hexagonal shaft 64 on which a pinion 65 is keyed for sliding along said shaft and which turns said spindle 40 within its housing 41 through said pinion 59. Thus in any position the cross-head occupies at the end of any forward stroke of the saddle, a slight turning increment, say of about 60°, may be communicated to the mandrel and stock by the motor 60 through shafts 63, 64 and pinion 65.

In producing tubing of uniform diameter, that is, rolling straight tubing as distinguished from tapered tubes, the stock introduced into the mill may be of indefinite length, and its rear end, as before noted, is held in the vise 49; whereas when producing tapered tubes according to the method of Patent No. 2,349,246, work-pieces of measured lengths only are used as the starting stock and they are screwed onto the ends of the spindle extension 52.

Figures 2D, 3D:
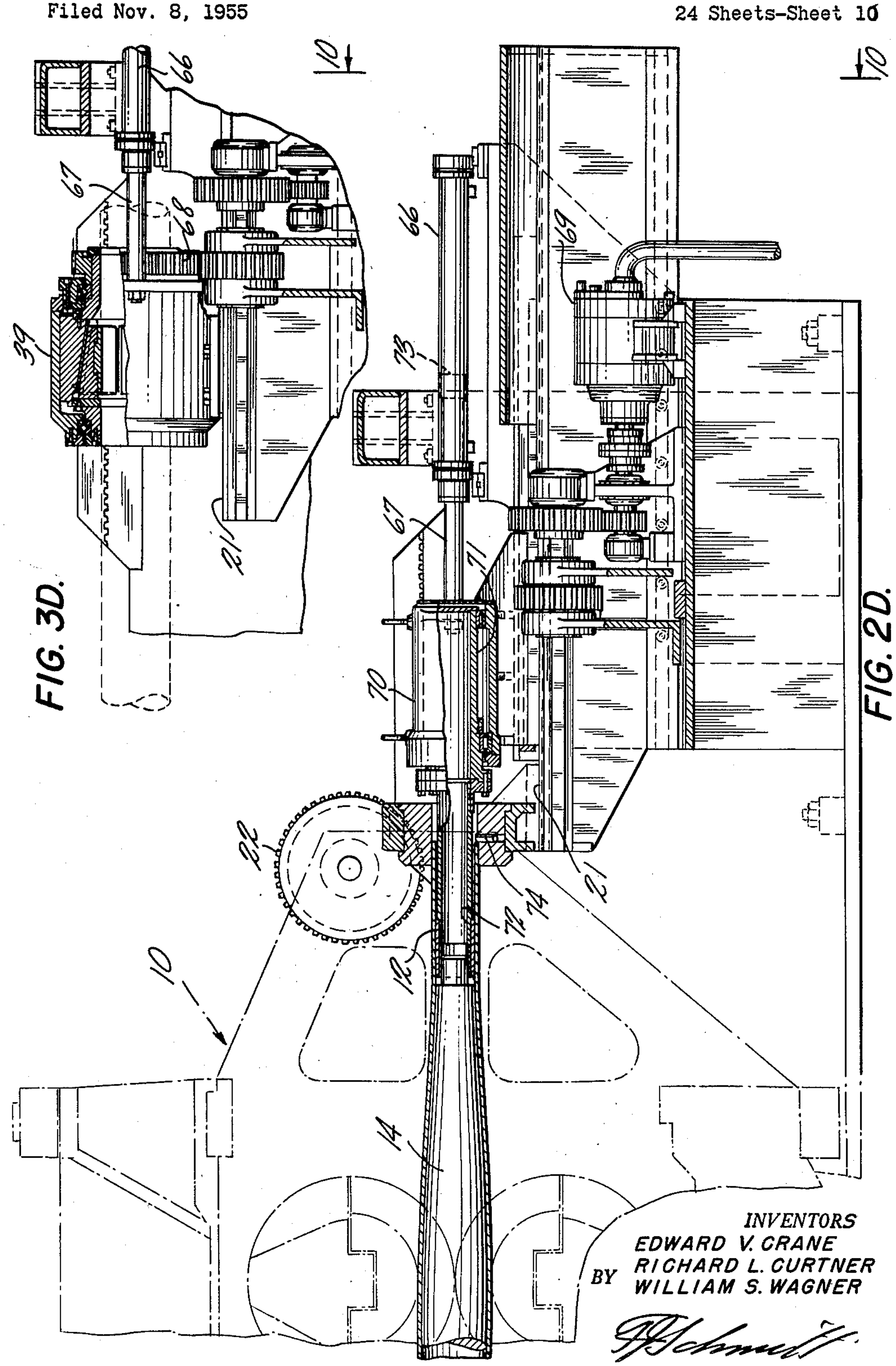
Fig. 3D is a view partly in longitudinal section and partly in elevation, of the forward end of the mill when set up for producing tubing of uniform diameter.
Figure 4:
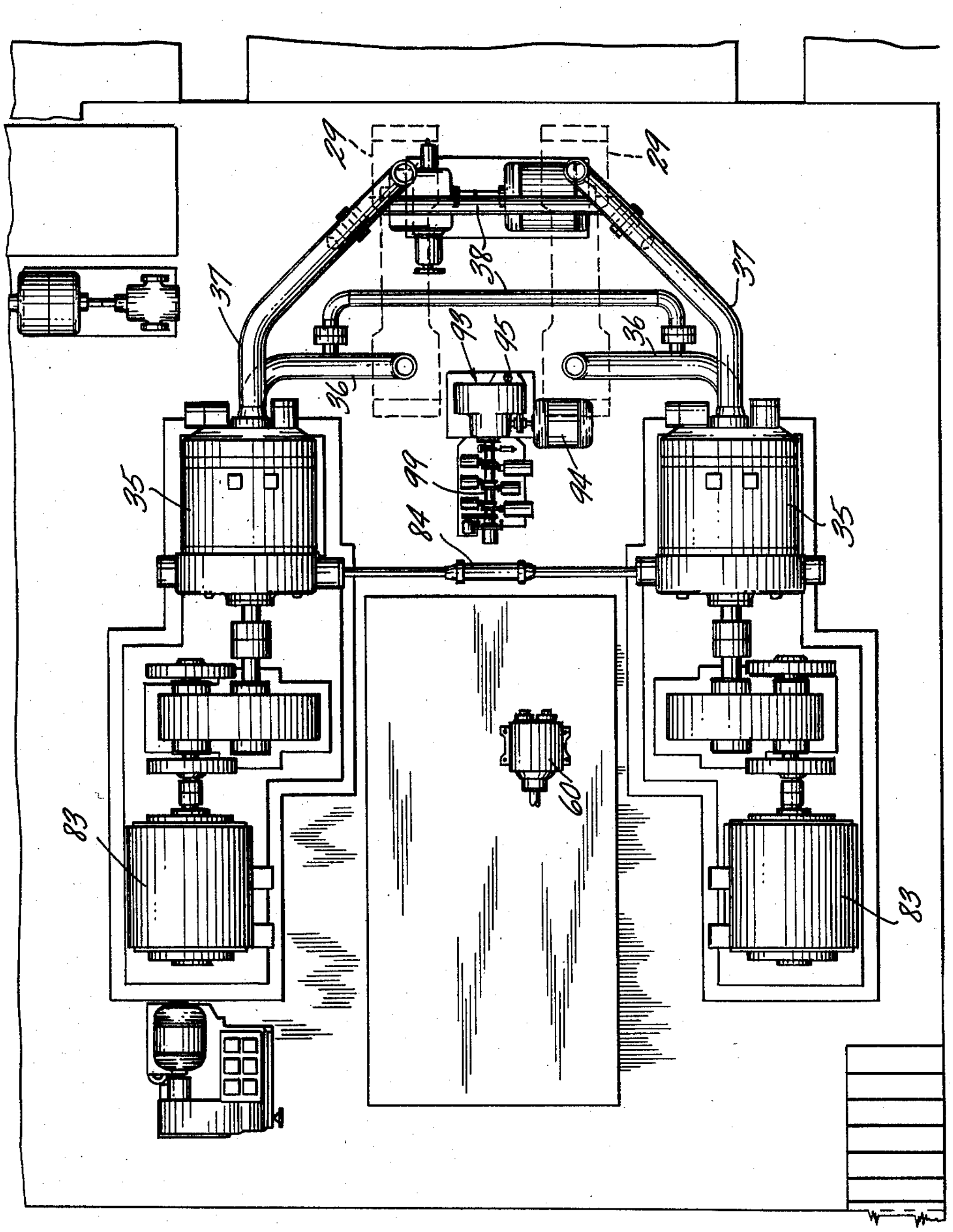
Fig. 4 is a plan view of the hydraulically operated mechanism for driving the reciprocating saddle, as seen from a plane indicated by the line 4—4 in Fig. 2.

In reducing a work-piece of indefinite length, a short section thereof at its out-going end will have passed beyond the range of the main turning mechanism hereinbefore described although its passage through the rolls will not have been completed. To complete its passage through the rolls, it is released from the vise 49, a fresh length of stock is introduced in the manner to be hereinafter explained, and the out-going section of the former length is fed forward and out of the mill by the fresh length. Since, however, the turning of said out-going section will not be effected by the main turning mechanism aforesaid, means are provided for this purpose at the front end of the mill. These means (Fig. 3D) may comprise a detachable unit secured to ways 21 and containing a rotatable friction clutch 39 through which said out-going section of stock passes, hydraulic cylinders 66 attachable to the mill frame and having piston rods 67 to slide said unit rearwardly, and a pinion 68 geared to the rotatable clutch 39 and operatively connected with a motor 69 (Fig. 2D) mounted on the mill frame. When the out-going section of stock moves forward through said unit the friction of the clutch causes its jaws to close tightly on said section; but when the piston rods 67 move said unit rearwardly, the jaws relax their grip.

When the mill is to be used for producing tapered tubes, the aforesaid unit is removed from the mill to make room for another unit which is then mounted for sliding on said ways 21. Said other unit consists of a sliding support 70 for the forward end of the mandrel and may comprise a spindle 71 free to be frictionally rotated by the mandrel. Said spindle has a rearward extension 72 in which the forward end of the mandrel rests and is supported, the end of the mandrel having a press-fit with the extension whereby the extension turns with the mandrel. The piston rods 67 of the cylinder 66 which at all times remains on the mill frame, are now connected to the support 70. By introducing fluid under pressure into the cylinders and on the right side of their pistons 73, the support 70 is constantly urged rearwardly; but when the work-piece is about half-way advanced along the mandrel extension 72, it closes a switch 74 which shifts the fluid pressure in the cylinders from the right side to the left side of their pistons 73 and causes the mandrel support to be drawn forward and out of the way of the advancing work-piece 12 which may now be removed from the mill.

*The stock loading mechanism*

When the mill is in operation the slide 54, to which the rear end of the mandrel and its spindle and enclosing housing 54' are secured, is locked to the mill frame by transversely slidable bolts 75 which are movable into and withdrawable from their locking positions by pistons in cylinders 76. And, as in said U.S. Patent No. 2,594,-126, when a new length of stock is to be introduced into the mill, the mill is stopped with its saddle in its forward position, then the slide 54 is unlocked and drawn rearwardly on ways 77, thereby moving the mandrel into a position for a new length of stock to be inserted over the forward end of the mandrel. For this purpose, an endless chain 78 is provided, mounted on sprockets 79 and attached to said slide, and serviced by a motor 80 for turning one of the sprockets through reduction gearing 81 and shaft 82. When the mandrel has thus been withdrawn to its rearward position and a new length of stock inserted, the mandrel is then returned to its forward or operative position, and readjusted through the nut 57 to the bore size and wall-thickness of the tubing to be rolled.

*The saddle drive*

As already stated, the saddle is reciprocated by the pistons 28 of cylinders 29, said pistons being actuated by fluid delivered to said cylinders by the main pumps 35. Each of these two pumps is of the well-known type called a "variable delivery pump," preferably one provided with a pair of tilting or "wobble" plates. When the mill is in operation, each said pump is continuously driven by its attached individual electric motor 83; and when its said tilting plates are in their neutral position, that is, in planes at right angles to the longitudinal axis of the pump, no fluid is taken in by or returned from the pump. But when the plates are tilited from their neutral position in one direction, the pump takes in fluid at one of its ports and discharges fluid from its other port in a closed circuit; and if said plates are then moved through their neutral positions and tilted in the other direction, the direction of the fluid through said pump is reversed—in other words, what was the intake port of the pump now becomes its outlet port and vice-versa. Thus the posture of said plates at any given moment not only determines whether at that moment any fluid flows through the pump at all and, if so, its direction, but the angle at which said plates are tilted at that moment, together with the speed at which the pumps are being driven at that same moment, also determines the rate at which the saddle cylinders are then receiving fluid and delivering fluid back to the pumps.

For shifting each pair of tilting plates from any one of their operative positions to another, a stroke control cylinder 84 having a piston 85 is provided, said piston having its rod 86 extending from each side thereof and operatively connected to the tilting plates of each pump 35 so as to move the plates of each pump together. On each side of said piston are ducts 87, 88 leading to said cylinder 84 from an accumulator 89 containing fluid under pressure. A valve 90 having a cam-actuated plunger 91 and an inner spring to cause the plunger to follow the cam, controls the admission of fluid to and the discharge of fluid from the cylinder 84 through said ducts. This cam 92 is integral with the casing of a differential gear (Fig. 11) which is generally referred to hereinafter as the "comparator" and is operatively related to a mechanical pilot 93 (Figs. 12 and 13) consisting preferably of a plate having a slot in the form of a Scotch yoke and which plate is caused to reciprocate with a harmonic movement by a variable speed motor 94. The movement of the plate is communicated to one of the shafts of said differential gearing, namely, the shaft 95, by a rack 96, while the reciprocatory movement of the saddle is communicated to the other shaft 97 of said gearing by another rack 98 which is attached to one end of the saddle and may be referred to as the saddle rack. Thus if the saddle gets out of phase with that of its mechanical pilot, that is, if the saddle travels ahead or lags behind its said pilot, the cam 92 will move the plunger of the valve 90 so the fluid from the accumulator 89 is admitted to one side or the other of the piston in the cylinder 84 to bring the saddle substantially in phase with the pilot.

This differential gearing or comparator is so constructed that its casing and the cam 92 mounted thereon will remain stationary when its two shafts 95 and 97 are turning in a fixed relation to each other both as to direction and rate of speed. When these conditions do not exist, the casing and cam will turn in the direction and at a rate determined by the resultant of the combined movements of both its shafts 95 and 97.

The pilot plate (Figs. 12 and 13) is reciprocated by the main shaft 99 which is rotated continuously during the operation of the mill by the variable speed motor 94 through worm and worm gear connections 100, 101. The pilot plate reciprocates in a guide 102 (shown in Fig. 2B) fixed to the mill frame, means being provided for converting the rotary motion of said shaft 99 into reciprocatory motion; and such means may comprise, for example, a roller-carrying slide 103 held in a hollow frame 104 which is rotated by the shaft 99, the position of the slide 103 being adjustable out from and in toward the center of the frame 104 by a screw 104'. As the frame 104 rotates the roller slide 103 travels back and forth therein, causing the pilot plate to reciprocate with a harmonic movement, that is, accelerating from zero to its maximum speed, then decelerating to zero, and then reversing its direction. Said plate carries the aforesaid pilot rack 96 the position of which is adjustable thereon through a screw 105. Thus as the shaft 99 revolves, the pilot rack will have a harmonic movement; and since the relation between its speed, length of stroke, and center position of stroke can be varied by changes of the motor speed and adjustments of screws 104', 105, this relation can be made proportional to that which it is desired the saddle to have between its speed, length of stroke and center position of stroke. The said pilot rack 96 meshes with a pinion 106 on the lower end of the comparator shaft 95, and the said saddle rack 98 meshes with a pinion 107 on the upper end of shaft 97 (Fig. 3) of the comparator.

As the pilot rack 96 is reciprocated by the pilot during the operation of the mill, the shaft 95 is turned thereby through the pinion 106. In like manner shaft 97 is turned through a pinion 107 and saddle rack 98, by the movement of the saddle. If the reciprocation of the saddle be precisely in step with that of the pilot and in the proper direction, the comparator housing will be stationary; however, since the movement of the comparator housing and its attached cam 92 is the primary motion in the sequence which controls the saddle drive, the saddle movement will normally be somewhat out of step with the movement of its pilot. This slight difference in actual saddle movement relative to the pilot movement causes the comparator housing to revolve a small distance. The valve 90 which is responsive to cam 92 and controls the flow of fluid to the stroke control cylinder 84, causes the tilting of the wobble plates of the main pumps to vary in such a way as to make the movement of the saddle conform proportionately to that of its pilot.

Figure 11:
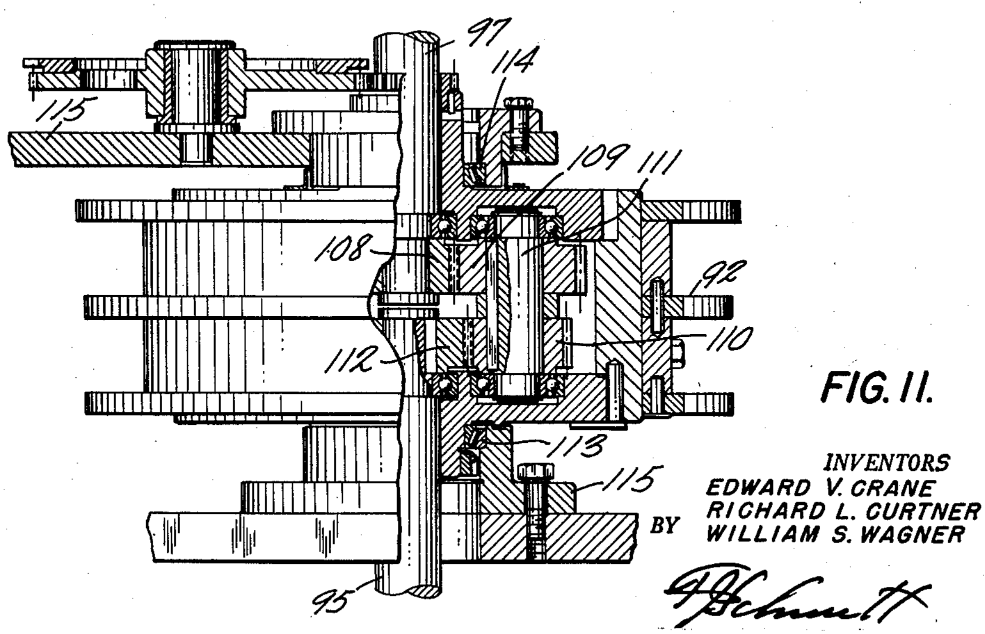
Fig. 11 is a view, partly broken away, of a differential gear box (hereinafter sometimes called the comparator) and which is shown on a smaller scale in Fig. 2B.
Figures 6, 7:
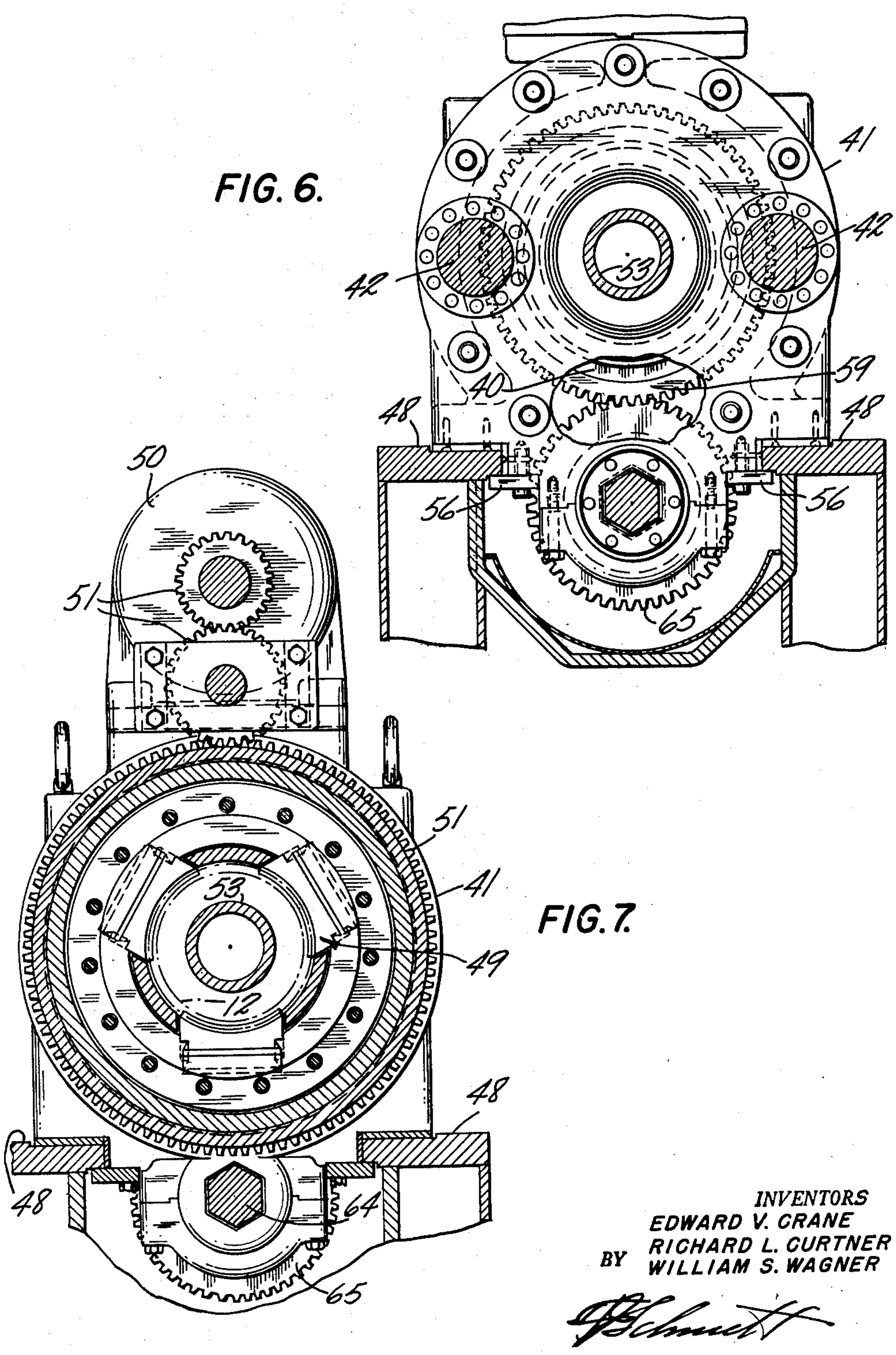
Fig. 6 is a sectional view taken on a plane indicated by the line 6—6 in Fig. 2B.
Fig. 7 is a sectional view taken on a plane indicated by the line 7—7 in Fig. 3B.
Figure 8:
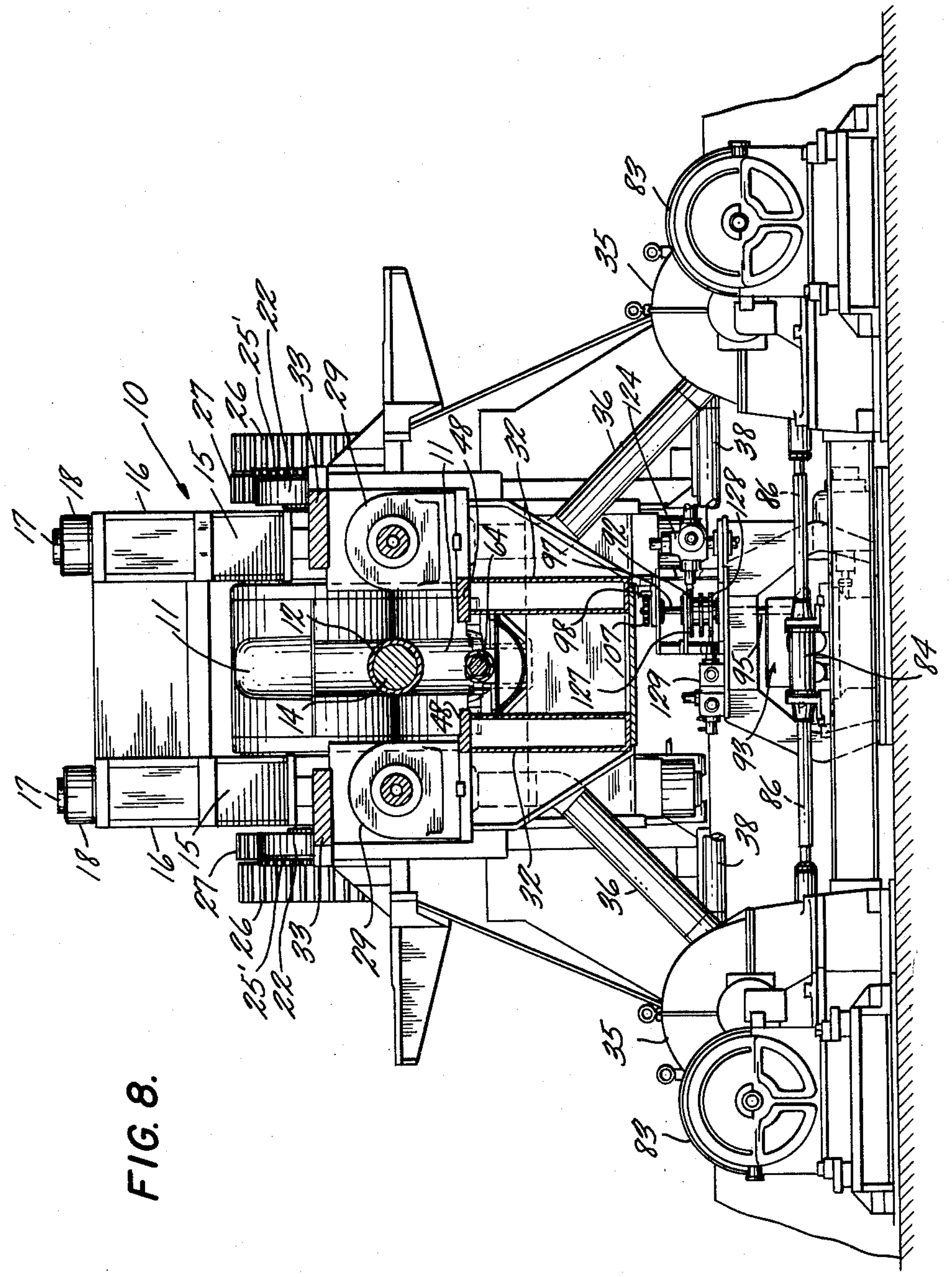
Fig. 8 is a sectional view, the plane or planes of which are indicated by the shifting line 8—8 in Fig. 2.
Figure 10:
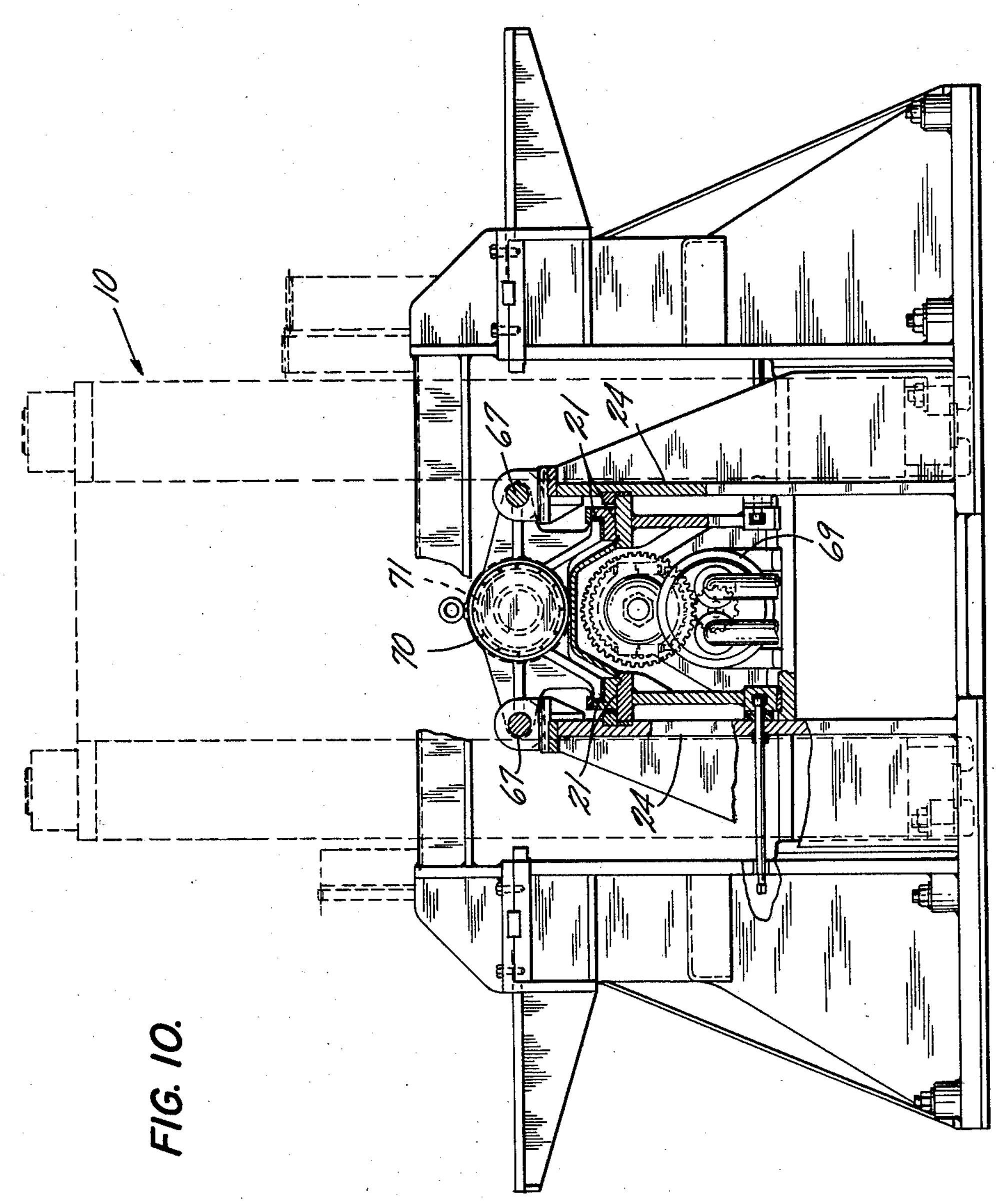
Fig. 10 is a front-end view of the mill as it appears from a plane indicated by the line 10—10 in Fig. 2D when partly broken away.
Figures 12, 13:
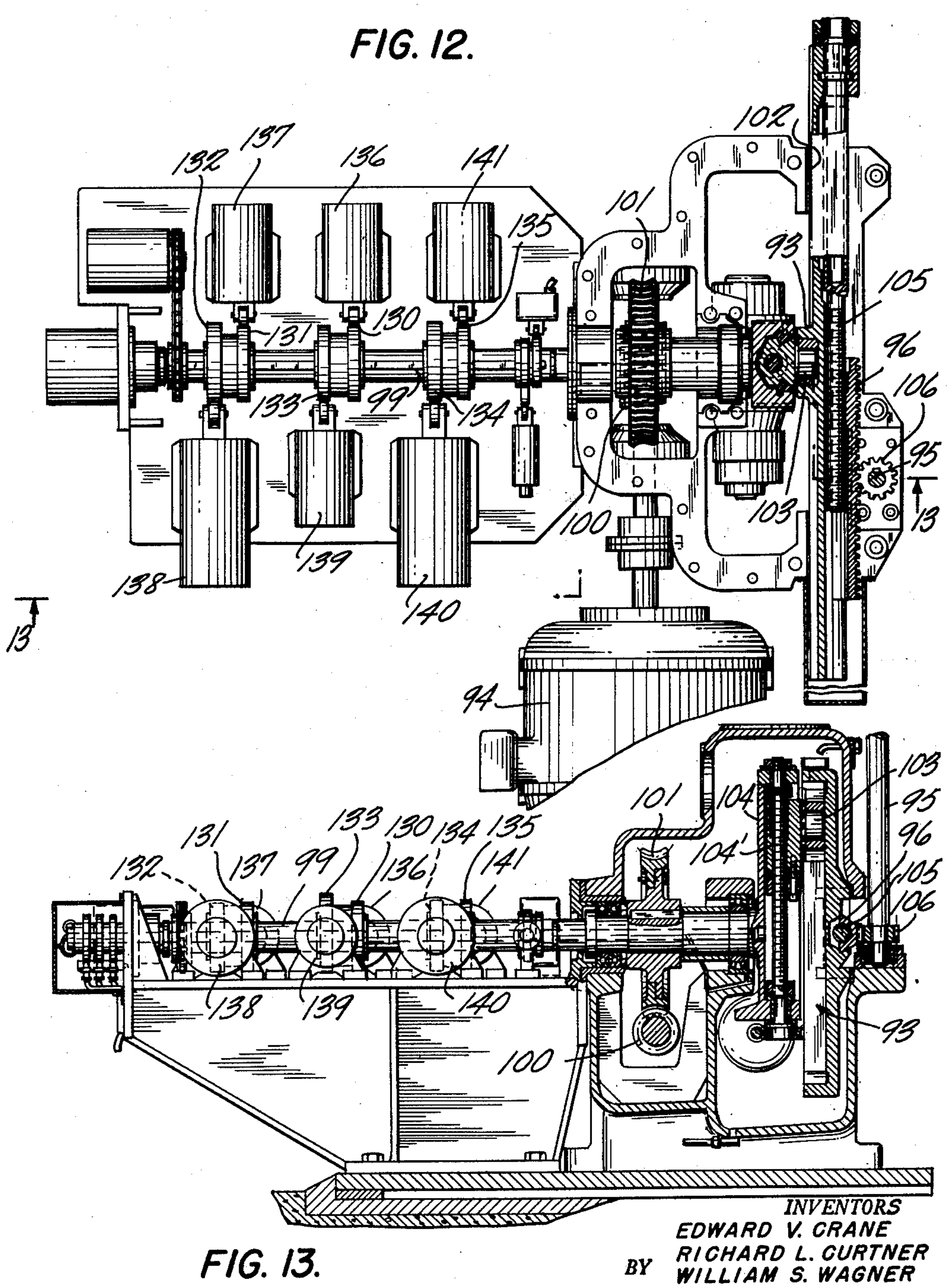
Fig. 12 is a view, partly in section and partly in plan, of the cycle-control mechanism of the mill shown in elevation on a smaller scale in Fig. 2B and in plan on Fig. 4.
Figure 13 is a sectional view of said cycle-control mechanism as seen from a plane indicated by the line 13—13 in Fig. 12.
Figure 14A:
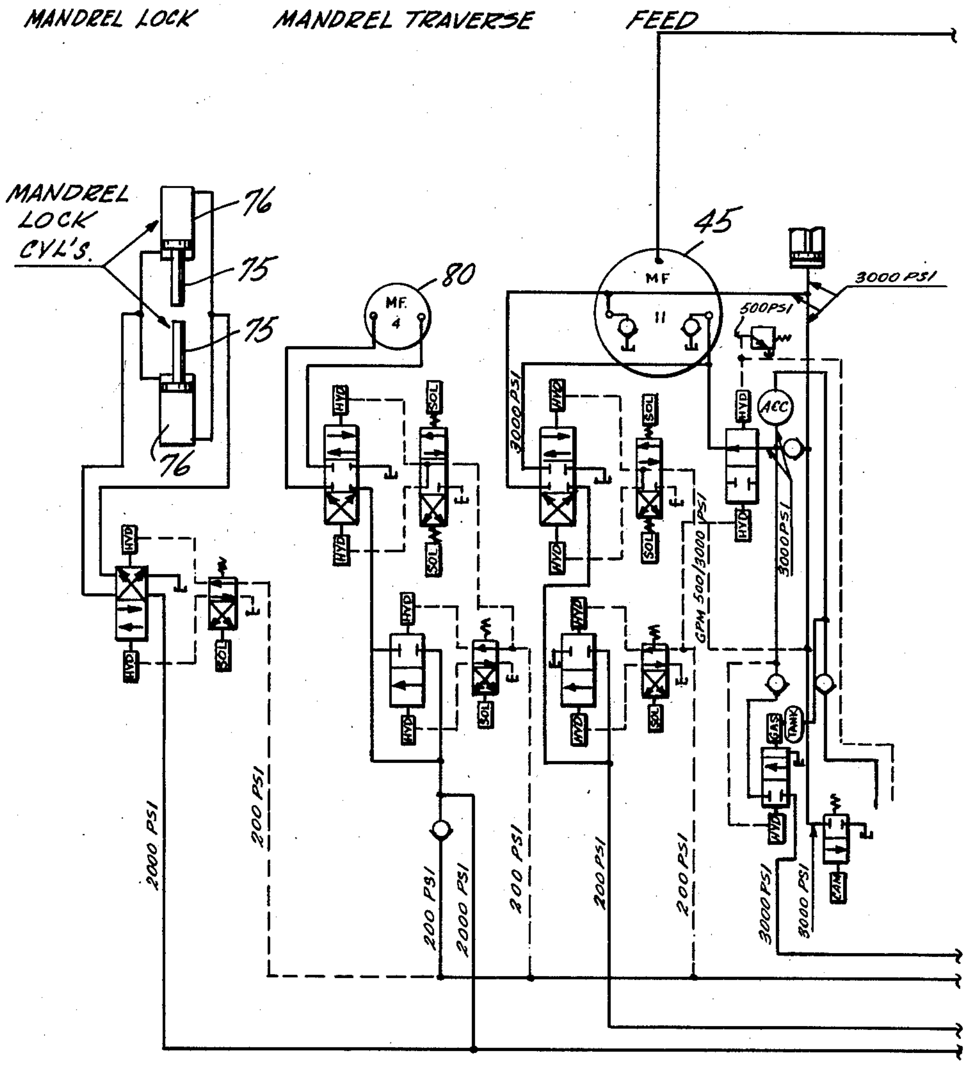
Figure 14B:
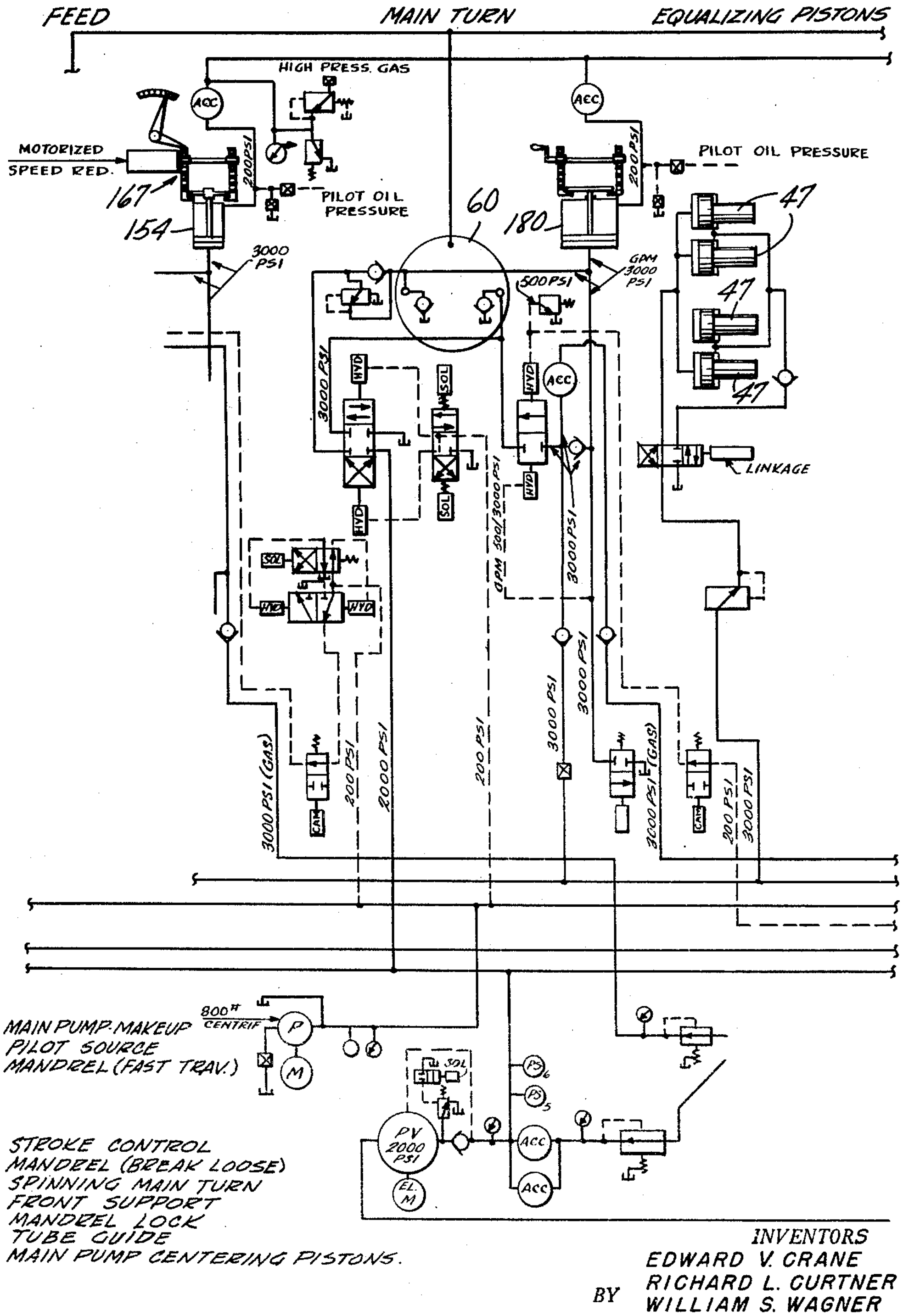
Figure 14C:
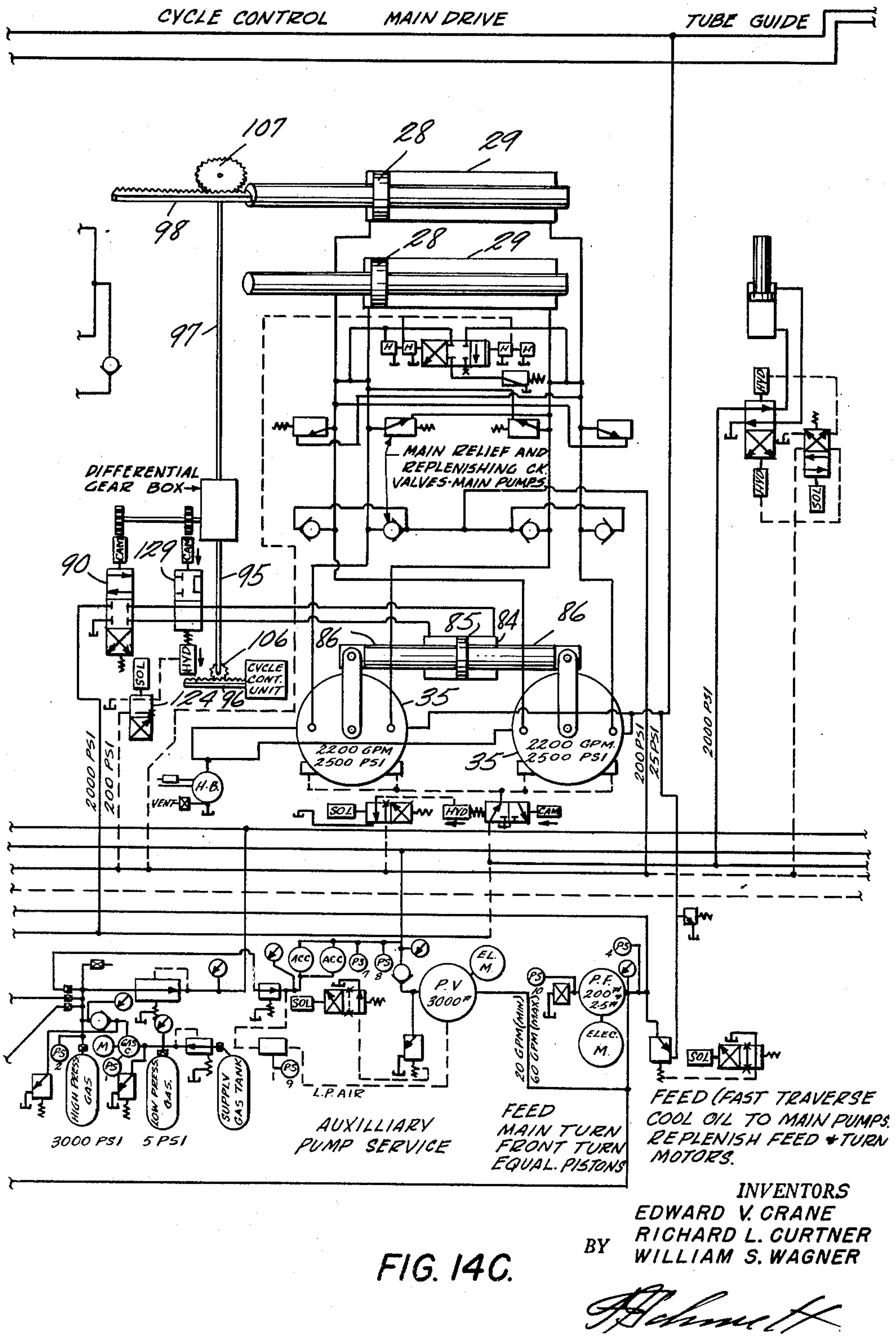
Figure 14D:
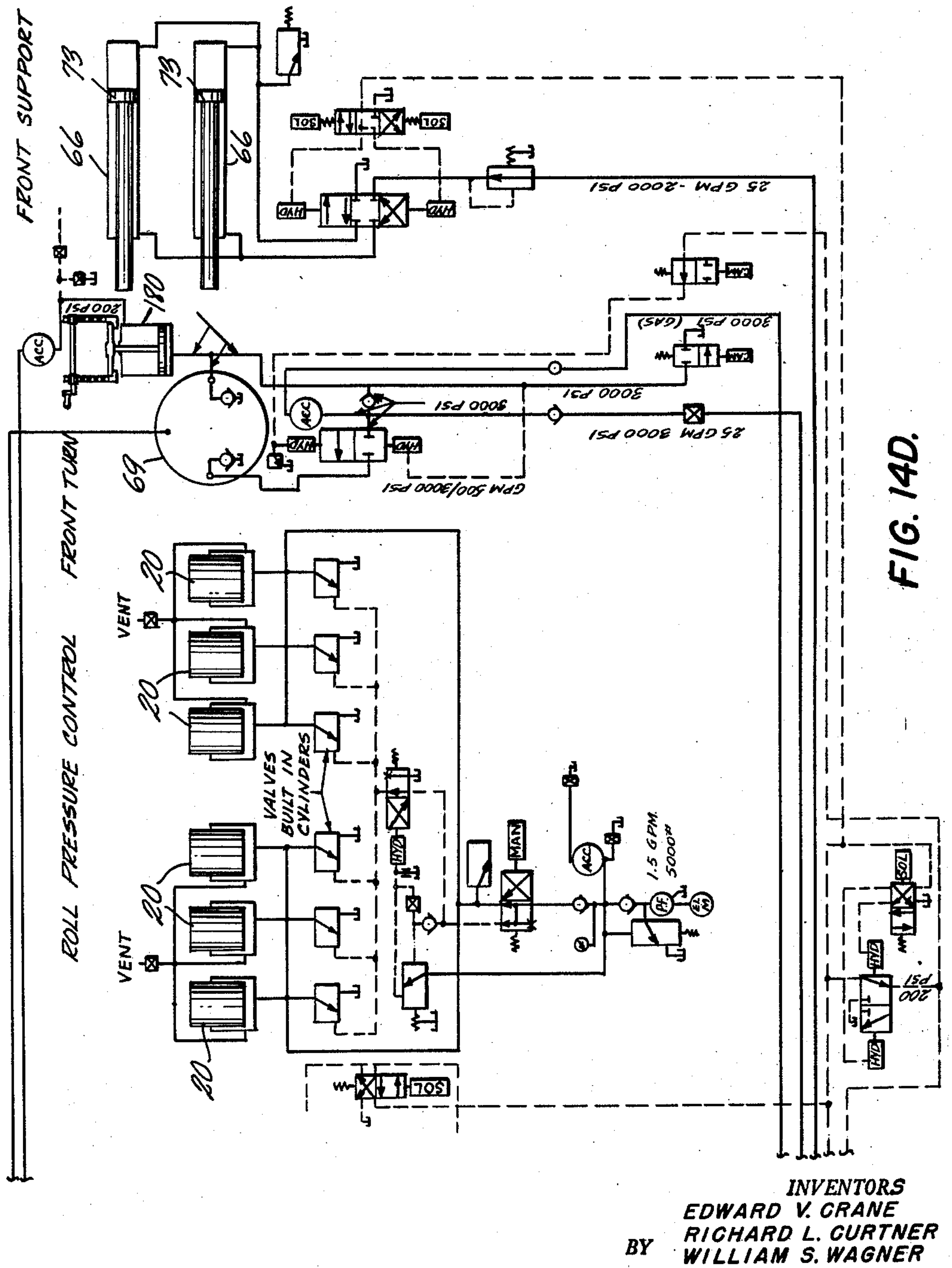

In Fig. 11 wherein the structure of the comparator is shown, a pinion 108 fixed to the lower end of shaft 97 meshes with a gear 109. The gear 109 and a gear 110 (of which there are two balancing sets) are both keyed to a shaft 111 the ends of which are journaled in the comparator housing. The gear 110 meshes with a gear 112 which is fixed to the upper end of shaft 95. A pinion 106 (shown in Fig. 13) is fixed to the lower end of shaft 95. The upper end of shaft 95 and the lower end of shaft 97 are carried in bearings mounted in the comparator housing. The housing is in turn carried by two bearings 113, 114 which are mounted in a bracket 115 which is fixed to the frame of the mill. Hence shafts 95 and 97 and the comparator housing rotate about a common vertical axis. The above gear train is such that, if the housing remain stationary and shaft 95 be rotated, shaft 97 will be driven in the same direction as shaft 95 but at a greater speed. Conversely, if shafts 97 and 95 are both driven in the same direction and at the proper speeds as determined by the gear ratio, then the housing will remain stationary. If shaft 97 be held stationary and shaft 95 be rotated in one direction, or if both said shafts be rotated in the aforesaid direction but with shaft 95 travelling relatively faster, then the housing will be driven in the same direction as shaft 95. If the same conditions hold except that the direction of rotation of the shafts are reversed, then the direction of rotation of the housing will also be reversed. Again, if shafts 97 and 95 be driven in the same direction with shaft 95 travelling the faster, then the housing will be driven in the opposite direction to that in which the shafts are being driven. In operation, the rotation of the housing is just a few degrees; therefore, shafts 97 and 95 must be driven, by the saddle and pilot respectively, in the same direction at speeds whose ratio is essentially that of the gear train from one rack to the other. As noted already, there is a speed reduction from shaft 97 to shaft 95. Also, pinion 107 is larger than pinion 106; therefore the speed reduction from the saddle rack 98 to the pilot rack 96 is even greater. This reduction is slightly greater than four to one. The saddle will travel a little more than four times the distance travelled by the pilot; and during operation the actual ratio of saddle stroke to pilot stroke is slightly higher than the actual ratio through the comparator. The difference in ratio will be just enough to give proper movement to the comparator housing in order for its cam 92 to shift the operating valve 90.

*The saddle control*

The diagram of Fig. 15 is supplied to illustrate the operation of the comparator and its associated mechanism in controlling the reciprocation of the saddle.

The position at any moment of the plunger 91 of the valve 90 determines whether fluid from the accumulator 89 is being admitted to the stroke control cylinder 84 and, if so, to which side of its piston 85 it is entering said cylinder. Said valve has three operative positions and four ports. In one of its positions all of its ports are blocked and consequently no fluid then passes from the accumulator into said cylinder. In another of its operative positions, said valve connects a duct 116 from the accumulator with a duct 88 which, through a duct 88', communicates with the space in said cylinder at the left of said piston as viewed in Fig. 15; and at the same time said valve also connects the space at the right of said piston with a duct 87' which, through a duct 87, communicates with a duct 117 leading to a sump tank 118; consequently in this position of said valve, the piston rod 86 which is operatively connected to the tilting plates 119 of the main pumps 35, is moved to the right as viewed in Fig. 15. In its third operative position said valve 90 connects the accumulator with the space at the right of said piston through ducts 87 and 87' and at the same time connects the space at the left of said piston with the sump tank through ducts 88', 88 and 117 thus causing the rod 86 to move to the left. Hence the position of the valve plunger 91 at any moment normally determines the posture of the wobble plates of the main pumps at that moment.

If, in an emergency, the comparator casing and the cam 92 mounted thereon should turn in either direction beyond a predetermined limit, it is important that the saddle shall promptly come to rest automatically. For this purpose, four cylinders 120 are provided, two for each said pump 35, and each of these cylinders has at one of its ends a compression spring 121 and a piston for compressing the same. Normally each said cylinder is in communication with an accumulator 89' through ducts 122 and 123 so that it will be filled with fluid under pressure thereby causing its piston 120' to hold its spring fully compressed against the end of the cylinder but, upon the emergency referred to, this fluid pressure is automatically released by connecting said cylinder with the sump tank through a valve 124 and ducts 122, 125 and 117, thus permitting the said springs to move the pistons of the cylinders 120 into a position for their rods 126' to grip arms 126 on the tilting plates and force each tilting plate into its neutral position to halt automatically the movement of the saddle. By mounting on the compartor casing a second cam 127 and providing said valve 124 controlled by that cam, the springs 121 may be compressed and released respectively at the proper times to bring about the result just described. In order that any fluid pressure in the stroke control cylinder 84 shall not interfere with the bringing about of that result, a third cam 128 of the same size and shape as cam 127 is mounted on the comparator casing and operates at the same instant as cam 127 to move the plunger of a valve 129 into position to connect ducts 87' and 88', so that when the springs 121 are released from compression, the pressure on each side of the piston in cylinder 84 will be equalized and the piston rod 86 will be free to be moved in either direction.

*The cycle control*

The aforesaid shaft 99 driven by the variable speed motor 94 and which, in turn, reciprocates the Scotch yoke pilot 93, carries six cams denoted by the numerals 130, 131, 132, 133, 134 and 135 respectively and which operate, in timed relation to the reciprocation of the pilot, six valves respectively 136, 137, 138, 139, 140 and 141. Of these, valves Nos. 136 and 137 control the incremental feeding of the stock to the rolls; valves 138 and 139 control the main mechanism for the incremental turning of the stock and mandrel when straight tubing is being rolled; and valves 140 and 141 control the front mechanism for similarly turning the stock and mandrel when straight tubing is being rolled.

As already explained, an increment of feed occurs in the present mill just prior to the forward stroke of the saddle, and is initiated by cam 130 controlling the operation of the valve 136 which is a spring-returned valve operatively related to the aforesaid stock feed motor 45. Referring now to the diagram of Fig. 16, when the cam 130 opens the valve 136 it permits fluid pumped by a centrifugal pump 142 from the sump 118 to pass through ducts 143, 144 and 145 to and through said valve 136 and thence through ducts 146 and 147 to one of the ports of a pilot-operated valve 148 thus opening said valve 148. High pressure fluid then flows from an accumulator 149 through a duct 150 to and through valve 148 and a duct 151 to the feed motor 45. Passing through this motor and driving it, the fluid flows through ducts 152 and 153 to a feed-measuring cylinder 154 and forces the piston in said cylinder to the left as viewed in the diagram; and this, in turn, forces the fluid already therein and occupying the space to the left of the piston, into a low-pressure accumulator 155. When the piston of cylinder 154 reaches the end of its stroke, pressure builds up in ducts 153, 152, 156, 157 and 158 and fluid flows through ducts 153, 156 and 157 to the other port of the pilot-operated valve 148. In the meantime cam 130 has permitted valve 136 to close. Fluid now entering said other port of valve 148 closes that valve thus stopping fluid flow from duct 150 to 151 and forcing fluid from the first referred to port of that valve through the duct 147, a duct 159, a relief valve 160, and a duct 161, to the sump. The feed motor 45 and its connected feed parts tend to continue rotating and their momentum may drive the motor as a pump causing a small amount of fluid to flow from the sump through a duct 162, a check valve 163 and duct 151 to the motor 45 and then through ducts 152 and 156 and check valve 164 to the accumulator 149. Working against the high pressure of the accumulator 149, the motor is quickly stopped and the increment of feed is complete. After that has taken place, cam 131 opens valve 137, sometimes called a dumping valve. Fluid from the low-pressure accumulator 155 then flows through a duct 165 to the left side of piston in the measuring cylinder 154 and forces said piston to the right, and fluid flows from the cylinder 154 through ducts 153, 156 and 158, valve 137 and duct 166 to the sump in order to reset the measuring cylinder for the next increment of feed. The effective volume of the feed measuring cylinder may be adjusted through a rack and pinion 167 to slide the piston-stop in one direction or the other.

The main mechanism for turning the stock and mandrel is actuated, as we have seen, by the motor 60; and this turning occurs directly following the completion of the forward stroke of the saddle and is initiated by cam 132 controlling the valve 138 which is operatively related to said motor 60. Referring now to the diagram of Fig. 17, when the cam 132 opens the spring-returned valve 138 it permits fluid pumped by the centrifugal pump 168 to pass through the ducts 169, 170 and 171 to and through said valve 138 and thence through ducts 172 and 173 to one of the ports of a pilot-operated valve 174, thus opening said valve 174. High pressure fluid then flows from an accumulator 175 through a duct 176, the valve 174 and a duct 177 to the turn-motor 60. Passing through this motor and driving it, the fluid flows through ducts 178 and 179 to a turn-measuring cylinder 180. The fluid discharged from turn-motor 60 enters the right side (as viewed from the diagram) of the cylinder 180 and forces its piston toward the left; and as the piston moves, it, in turn, forces fluid from the left side of the piston through a duct 181 into a low-pressure accumulator 182. When said piston reaches the end of its stroke, pressure builds up in ducts 178, 179, 183, 184 and 185 and fluid flows through ducts 179, 183 and 184 to the other port of the pilot-operated valve 174. In the meantime cam 132 has permitted valve 138 to close. Fluid now entering said other port of valve 174 closes that valve, thus stopping fluid flow from duct 176 to duct 177 and forcing fluid from the first pilot connection of the valve through ducts 173 and 186, a relief valve 187 and a duct 188 to the sump. The turn-motor 60 and its connected parts tend to continue rotating and their momentum tends to drive the motor 60 as a pump causing a small amount of fluid to flow from the sump through a duct 189 and check valve 190 and duct 177 to said motor 60 and then through ducts 178 and 183 and a check valve 191 to the high-pressure accumulator 175, but, working as it does against the high-pressure of the accumulator 175, said motor is quickly stopped and the turning increment is then complete. After this turning increment has been effected, cam 133 opens the dumping valve 139 and fluid from the accumulator 182 then flows through duct 181 to the left side of the measuring cylinder 180 forcing its piston to the right and causing fluid to flow from the right side of the piston through ducts 179 and 185, valve 139 and duct 192 back to the sump, thus resetting said piston in readiness for the next turning increment. The capacity of the measuring cylinder 180 may be adjusted by the insertion or removal of shims as indicated in the diagram.

At the forward end of the mill the mandrel and stock are turned by mechanism similar to the main turning mechanism just described. The initiating valve 140 and the dumping valve 141 for the forward turn are respectively the same as those for the main turn; and the same is true of the valve-operating cams 134 and 135. The latter are both mounted on the cycle control shaft 99 and operate simultaneously.

We claim as our invention:

1. In a pilger mill, the combination of a fluid operated motor, an accumulator for holding fluid under pressure, a fluid conduit connecting the accumulator with said motor, a pilot-operated valve in said conduit in normally closed position to control the flow of fluid from said accumulator to said motor, a sump tank, a turn-measuring cylinder a fluid conduit connecting said sump tank with a pilot port of said valve, a second valve including an operator in said latter conduit to control the flow of fluid from said sump tank to the pilot port of said first-mentioned valve, a pump in said latter conduit to pump fluid from the sump tank to said pilot port to open said first-mentioned valve, a driven shaft, and a cam carried by said shaft in operative engagement with the operator of said second valve.

2. The combination of claim 1 and a second accumulator, a fluid conduit connecting said second accumulator to the outlet of said motor via said turn-measuring cylinder, a fluid measuring device in said latter conduit, a third valve, a fluid conduit connecting said third valve with said conduit between said motor and said measuring device, a fluid conduit connecting said third valve and the sump tank, a fluid conduit connecting another pilot port of said first named valve with the conduit between the third valve and the conduit between the motor and the measuring device, and a second cam carried by said shaft for operating said third valve.

3. In a pilger mill, the combination of a fluid-operated motor, an accumulator for holding fluid under pressure, a sump tank, a pilot-operated valve, a turn-measuring cylinder, a duct leading from said valve to said motor, a duct connecting said accumulator to said valve, a conduit leading from said tank to a pilot port of said valve, a low pressure accumulator, a starting valve in said conduit, a dumping valve, a conduit leading from said low pressure accumulator through said dumping valve to said tank, a shaft positioned in operative relationship to the starting and dumping valves, means on said shaft to control the operation respectively of said starting and dumping valves, a pump in said first mentioned conduit to deliver fluid from said sump tank to said port to open said pilot-operated valve, a conduit leading from the outlet of said motor to said low pressure accumulator via said turn measuring cylinder, a fluid measuring device in the last named conduit, and a conduit leading from said measuring device to another pilot port of said pilot-operated valve.

4. In a pilger mill having a saddle mounted for reciprocal movement and tube reducing means carried by said saddle, reciprocating means for reciprocating said saddle, said reciprocating means comprising a pump, a drive control cylinder, a drive control piston in said cylinder, said piston connected to and controlling flow of fluid through said pump, an accumulator for holding fluid under pressure, ducts connecting said accumulator to each side of said drive control cylinder and a first cam actuated valve means in said ducts controlling the flow of fluid therethrough, a mechanical pilot means having a reference reciprocating motion and control means to control the reciprocating means for said saddle in synchronization with said pilot means, said control means including a comparator comprising a differential gearing and a pair of axially aligned shafts connected to said gearing, means opertively connecting one of said shafts to said saddle, means operatively connecting the other of said shafts to said pilot and a first cam for actuating said first valve means operatively connected to said differential gearing whereby actuation of said valve means is controlled by movement of said shafts through the differential gearing.

5. The combination of claim 4 wherein said pump is of the tilting plate type.

6. The combination of claim 4 and a second cylinder positoned adjacent said pump, a second piston in said second cylinder, a duct leading from the accumulator to said second cylinder at one side of the second piston, a sump, a duct leading from said cylinder to said sump, a valve having a stem in said duct controlling the admission of fluid from the accumulator to said second cylinder and the discharge therefrom to the sump, a second cam operatively connected to said differential gearing and engaging said valve stem, and a compressed spring in said second cylinder adapted to move said second piston into operative connection with said drive control piston when the fluid pressure in said second cylinder is released by the discharge of fluid therefrom to said sump.

7. The combination of claim 6 and a second valve means having a stem, said second valve means being fluid connected in the ducts connecting said drive control cylinder and said accumulator and fluid connecting said ducts upon actuation of said stem, a third cam operatively connected to said differential gearing and engaging the stem of said second valve means, said third cam operatively connected to said differential gearing to operate at the same instant as said second cam, whereby said drive control ducts are connected to equalize the pressure on each side of the drive control piston and permit the drive control piston to be freely movable in either direction.

References Cited in the file of this patent

UNITED STATES PATENTS

| | | |
|---|---|---|
| 1,943,061 | Douglas | Jan. 9, 1934 |
| 2,412,053 | Lucien | Dec. 3, 1946 |
| 2,480,403 | Ferris | Aug. 30, 1949 |
| 2,573,368 | Seborg | Oct. 30, 1951 |
| 2,575,308 | White | Nov. 13, 1951 |
| 2,594,126 | Coe | Apr. 22, 1952 |
| 2,631,480 | Romine et al. | Mar. 17, 1953 |
| 2,636,346 | Hoffman | Apr. 28, 1953 |
| 2,714,288 | Davis | Aug. 2, 1955 |